United States Patent
Stark et al.

(10) Patent No.: US 6,599,556 B2
(45) Date of Patent: Jul. 29, 2003

(54) PROTEIN SUPPLEMENTED CONFECTIONERY COMPOSITIONS

(75) Inventors: Ann M. Stark, Marion, IA (US); Scott D. Johnson, Epharata, PA (US); Harapanahalli S. Muralidhara, Plymouth, MN (US); Michael A. Porter, Maple Grove, MN (US); Ian Purtle, Plymouth, MN (US); Jagannadh V. Satyavolu, Cedar Rapids, IA (US); William H. Sperber, Minnetonka, MN (US)

(73) Assignee: Cargill, Inc., Wayzata, MN (US)

( * ) Notice: Subject to any disclaimer, the term of this patent is extended or adjusted under 35 U.S.C. 154(b) by 37 days.

(21) Appl. No.: 09/883,495

(22) Filed: Jun. 18, 2001

(65) Prior Publication Data
US 2002/0114877 A1 Aug. 22, 2002

Related U.S. Application Data

(63) Continuation-in-part of application No. 09/717,923, filed on Nov. 21, 2000.

(51) Int. Cl.[7] ................................................. A23J 1/14
(52) U.S. Cl. ........................ 426/656; 426/634; 426/629; 426/658
(58) Field of Search .............................. 426/656, 634, 426/658, 629

(56) References Cited

U.S. PATENT DOCUMENTS

| | | |
|---|---|---|
| 3,361,575 A | 1/1968 | Paulsen |
| 3,586,662 A | 6/1971 | O'Connor ................. 260/123.5 |
| 3,622,556 A | 11/1971 | O'Connor ................. 260/123.5 |
| 3,630,753 A | 12/1971 | McInychyn |
| 3,660,111 A | 5/1972 | Koch |
| 3,728,327 A | 4/1973 | Frazeur et al. ............ 260/123.5 |
| 3,736,147 A | 5/1973 | Iacobucci et al. .............. 99/17 |
| 3,880,755 A | 4/1975 | Thomas et al. ................ 210/91 |
| 3,896,241 A | 7/1975 | Malaspina et al. ........... 426/271 |
| 3,958,015 A | 5/1976 | Gay ............................ 426/18 |
| 3,993,636 A | 11/1976 | Maubois et al. ......... 260/123.5 |
| 3,995,071 A | 11/1976 | Goodnight, Jr. et al. .... 426/598 |
| 4,018,752 A | 4/1977 | Bühler et al. ........... 260/112 R |
| 4,028,468 A | 6/1977 | Hohner et al. .............. 426/436 |
| 4,069,103 A | 1/1978 | Müller ........................... 195/4 |
| 4,072,670 A | 2/1978 | Goodnight, Jr. et al. . 260/123.5 |
| 4,075,361 A | 2/1978 | Oberg ......................... 426/655 |
| 4,088,795 A | 5/1978 | Goodnight, Jr. et al. .... 426/598 |
| 4,091,120 A | 5/1978 | Goodnight, Jr. et al. .... 426/598 |
| 4,125,527 A | 11/1978 | Buhler et al. ........... 260/112 R |
| 4,147,745 A | 4/1979 | Sano et al. ..................... 264/22 |
| 4,163,010 A | 7/1979 | Garbutt .................. 260/112 R |
| 4,252,652 A | 2/1981 | Elfert et al. ................. 210/654 |
| 4,256,652 A | 3/1981 | Kidani et al. ........... 260/429 R |
| 4,293,571 A | 10/1981 | Olofsson et al. ................ 426/7 |
| 4,324,805 A | 4/1982 | Olsen ............................ 426/46 |
| 4,332,719 A | 6/1982 | Lawhon et al. .......... 260/123.5 |
| 4,346,122 A | 8/1982 | Orthoefer et al. |
| 4,420,425 A | 12/1983 | Lawhon .................... 260/123.5 |
| 4,624,805 A | 11/1986 | Lawhon ....................... 530/376 |
| 4,697,004 A | 9/1987 | Puski et al. .................. 530/378 |
| 4,787,976 A | 11/1988 | Parham et al. ......... 210/500.23 |
| 4,889,921 A | 12/1989 | Diosady et al. .............. 530/377 |
| 4,897,465 A | 1/1990 | Cordle et al. ................ 530/387 |
| 4,906,379 A | 3/1990 | Hodgins et al. ............. 210/638 |
| 4,943,373 A | 7/1990 | Onishi et al. .......... 210/500.42 |
| 4,943,374 A | 7/1990 | Heininger et al. ........... 210/651 |
| 5,000,848 A | 3/1991 | Hodgins et al. ........ 210/321.68 |
| 5,039,420 A | 8/1991 | Klein et al. .................. 210/645 |
| 5,086,166 A | 2/1992 | Lawhon et al. .............. 530/378 |
| 5,290,448 A | 3/1994 | Sluma et al. ........... 210/500.23 |
| 5,456,843 A | 10/1995 | Koenhen ..................... 210/651 |
| 5,476,590 A | 12/1995 | Brose et al. ................. 210/636 |
| 5,503,746 A | 4/1996 | Gagnon ....................... 210/490 |
| 5,503,832 A | 4/1996 | De Stoutz |
| 5,554,292 A | 9/1996 | Maeda et al. ................ 210/640 |
| 5,658,714 A | 8/1997 | Westfall et al. .............. 530/378 |
| 5,707,522 A | 1/1998 | Maeda et al. .......... 210/500.23 |
| 5,760,182 A | 6/1998 | Adachi et al. ............... 530/378 |
| 5,939,182 A | 8/1999 | Huang et al. ................ 428/323 |
| 6,056,903 A | 5/2000 | Greenwood et al. ........... 264/41 |
| 2002/0102339 A1 | 8/2002 | Akashe et al. |

FOREIGN PATENT DOCUMENTS

| | | |
|---|---|---|
| GB | 1 540 376 | 2/1979 |
| GB | 1 580 051 | 11/1980 |
| WO | WO 98/12209 | 3/1998 |
| WO | WO 01/06866 | 7/2000 |

OTHER PUBLICATIONS

Cheryan, "Mass Tranfer Characteristics of Hollow Fiber Ultrafitration of Soy Protein System," *J. Food Proc. Eng.*, 1, pp. 269–287 (1977).

Gould et al., "A Practical Approach to Controlling the Fouling of Ultrafiltration Membranes: A Case Study of the Successful Development of a Commercial Soy Protein Application," available @ http://www.osmonics.com/products/Page823.htm (available at least by Dec. 3, 1999).

Lawhon et al., "Processing Whey–Type By–Production Liquids from Cottonseed Protein Isolation with Ultrafiltration and Reverse Osmosis Membranes," *J. Food Proc. Eng.*, 1, pp. 15–35 (1977).

Lawhon et al., "Production of Protein Isolates and Concentrates from Oliseed Flour Extracts using Industrial Ultrafiltration and Reverse Osmosis Systems," *Journal of Food Science*, 42, pp. 389–394 (1977).

(List continued on next page.)

*Primary Examiner*—Anthony J. Weier
(74) *Attorney, Agent, or Firm*—Foley & Lardner

(57) ABSTRACT

Confectionery products, which include high protein content modified oilseed material, are described. The modified oilseed material typically includes at least 85 wt. % protein (dry solids basis) and has a relatively high average molecular weight, e.g., at least about 40 wt. % of the material has an apparent molecular weight greater than 300,000 daltons.

29 Claims, No Drawings

OTHER PUBLICATIONS

Lawhon et al., "Optimization of Protein Isolate Production from Soy Flour Using Industrial Mambrane Systems," *Journal of Food Science, 43*, pp. 361–369 (1978).

Lawhon et al., "Alternate Processes for Use in Soy Protein Isolation by Industrial Ultrafiltration Membranes," *Journal of Food Science, 44*, pp. 213–219 (1979).

Lawhon et al., "Soy Protein Ingreedients Prepared by New Processes–Aqueous Processing and Industrial Membrane Isolation," *Journal of the American Oil Chemists'Society, 58*, pp. 377–383 (Mar. 1981).

Lawhon et al., "Production of Oil and Protein Food Products from Raw Peanuts by Aqueous Extraction and Ultrafiltration," *Journal of Food Science, 46*, pp. 391–395 (1981).

Lawhon et al., "Combining Aqueous Extraction and Membrane Isolation Techniques to Recover Protein and Oil from Soybeans," *Journal of Food Science, 46*, pp. 912–916 (1981).

Lawson et al., "New Techniques in Membrane Processing of Oilseeds," *Food Technology, 38*, pp. 97–106 (1984).

Nichols et al., "Production of Soy Isolates by Ultrafiltration: Factors Affecting Yield and Composition," *J. Food Sci., 46*, pp. 367–372 (1981).

Okubo et al., "Preparation of Low–Phytate Soybean Isolate and Concentrate by Ultrafiltration," *Cereal Chemistry, 52*, pp. 263–271 (1975).

Omosaiye et al., "Removal of Oligosaccharides from Soybean Water Extracts by Ultrafiltration," *J. Food Sci., 43*, pp. 354–360 (1978).

Omosaiye et al., "Ultranfiltration of Soybean Water Extracts: Processing Characteristics and Yields," *J. Food Sci., 44*, pp. 1027–1031 (1979).

Omosaiye et al., "Low–Phytate, Full–Fat Soy Protein Product by Ultrafiltration of Aqueous Extracts of Whole Soybeans," *Cereal Chem., 56*, pp. 58–62 (1979).

Osmonics, "Osmonics® Ultrafilic ® M–Series Membrane Engineered to be 'Fouling–Free,'" available @ http://www.osmonics.com/scripts/PressTmpl.aps?PressRellD=307 (dated Oct. 4, 1999).

Osmonics, "UltraFilic Membranes," available @ http://www.osmonics.com/products/Page918.htm (available at least by Nov. 15, 2000).

Porter et al., "Membrane ultrafiltration," *Chem. Tech.*, pp. 56–63 (Jan. 1971).

Tarok, "The Filtration Spectrum," available @ http://www.osmonics.com/products/Page710.htm (Published in "Filtration News" on May 1, 1994).

United Soybean Board, "Soy Protein Isolata" available @ http://www.talksoy.com/isolate.htm (available at least by Sep. 6, 2000).

Protein Technologies International "Supro® 425 Isolated Soy Protein Product Description" (available at least by Jun. 1, 2001) 1 page.

Protein Technologies International "Supro® 500E Isolated Soy Protein" (available at least by Aug. 1998) 1 page.

Protein Technologies International "Supro® 515 Isolated Soy Protein" (available at least by Sep. 1997) 1 page.

Protein Technologies international "Supro® 661 Isolated Soy Protein Product Description" (available at least by Jun. 1, 2001) 1 page.

Protein Technologies International "Supro® 670 Isolated Soy Protein" (available at least by Feb. 10, 1999) 2 pages.

Protein Technologies International "Supro® 760 Isolated Soy Protein Product Description" (available at least by Jun. 1, 2001) 1 page.

ADM, "PRO FAM® 646, 648, and 982 Isolated Soy Proteins 066–646, 066–648, and 066–982" (available at least by Jun. 1, 2001) 1 page.

ADM. "PRO FAM® 970, 972, 974, and 981 Isolated Soy Proteins 066–970, 066–972, 066–974, and 066–981" (available at least by Jun. 1, 2001) 1 page.

Protein Technologies International "FP–940 Isolated Soy Protein" (available at least by Jun. 1, 2001) 1 page.

PROTEIN SUPPLEMENTED CONFECTIONERY COMPOSITIONS

RELATED APPLICATION

This application is a continuation-in-part of application Ser. No. 09/717,923 entitled "Process for Producing Oilseed Protein products," filed Nov. 21, 2000, which is incorporated by reference herein.

BACKGROUND

Modified oilseed materials are used as food additives for enhancing texture and other functional characteristics of various food products as well as a source of protein. The use of modified oilseed materials particularly modified soybean materials may be limited in some instances, however, due to their beany flavor and tan-like color. It is still unclear exactly which components are responsible for the flavor and color characteristics of oilseeds, though a variety of compounds are suspected of causing these characteristics. Among these are aliphatic carbonyls, phenolics, volatile fatty acids and amines, esters and alcohols.

There are extensive reports of processes used for the isolation, purification and improvement of the nutritional quality and flavor of oilseed materials, particularly soybean materials. Soybean protein in its native state is unpalatable and has impaired nutritional quality due to the presence of phytic acid complexes which interfere with mammalian mineral absorption, and the presence of antinutritional factors which interfere with protein digestion in mammals. The reported methods include the destruction of the trypsin inhibitors by heat treatment as well as methods for the removal of phytic acid. A wide variety of attempts to improve the yield of protein secured as purified isolate relative to that contained in the soybean raw material have also been described.

Many processes for improving soy protein flavor involve the application of heat, toasting, alcohol extraction and/or enzyme modification. These types of processes often result in substantial protein denaturation and modification, thereby substantially altering the product's functionality. In addition, these processes can promote interactions between proteins with lipid and carbohydrate constituents and their decomposition products. These types of reactions can reduce the utility of soy proteins in food products, especially in those that require highly soluble and functional proteins, as in dairy foods and beverages.

Commercial soy protein concentrates, which are defined as soy protein products having at least 70% by weight protein (dry solids basis or "dsb"), are generally produced by removing soluble sugars, ash and some minor constituents. The sugars are commonly removed by extracting with: (1) aqueous alcohol; (2) dilute aqueous acid; or (3) water, after first insolubilizing the protein with moist heating. These processes generally produce soy protein products with a distinctive taste and color.

Soy protein isolates are defined as products having at least 90% by weight protein (dsb). Commercial processes for producing soy protein isolates are generally based on acid precipitation of protein. These methods of producing, typically include (1) extracting the protein from soy flakes with water at an alkaline pH and removing solids from the liquid extract; (2) subjecting the liquid extract to isoelectric precipitation by adjusting the pH of the liquid extract to the point of minimum protein solubility to obtain the maximum amount of protein precipitate; and (3) separating precipitated protein curd from by-product liquid whey. This type of process, however, still tends to produce a protein product with a distinctive taste and color.

A number of examples of processes for producing concentrated soy protein products using membrane filtration technology have been reported. Due to a number of factors including cost, efficiency and/or product characteristics, however, membrane-based purification approaches have never experienced widespread adoption as commercial processes. These processes can suffer from one or more disadvantages, such as reduced functional characteristics in the resulting protein product and/or the production of a product which has an "off" flavor and/or an off-color such as a dark cream to light tan color. Membrane-based processes can also be difficult to operate under commercial production conditions due to problems associated with bacterial contamination and fouling of the membranes. Bacterial contamination can have undesirable consequences for the flavor of the product.

SUMMARY

Confectionery compositions which include a modified oilseed material with desirable flavor and/or color characteristics derived from oilseed material, such as defatted soybean white flakes or soybean meal, are described herein. The confectionery compositions, which include the modified oilseed material are particularly suitable for use as a protein source for human and/or animal consumption.

The present modified oilseed material can be produced by a membrane-based purification process which typically includes an extraction step to solubolize proteinaceous material present in an oilseed material. It may be desirable to conduct the extraction as a continuous, multistage process, e.g., a countercurrent extraction.

The modified oilseed material can commonly be produced by a process which includes an extraction step to solubilize proteinaceous material present in an oilseed material. The process uses one or more microporous membranes to separate and concentrate protein from the extract. It is generally advantageous to use a microporous membrane which has a filter surface with a relatively low contact angle, e.g., no more than about 40 degrees. The process commonly utilizes either relatively large pore ultrafiltration membranes (e.g., membranes with a molecular weight cut-off ("MWCO") of about 25,000 to 500,000) or microfiltration membranes with pore sizes up to about 1.5$\mu$. When microfiltration membranes are employed, those with pore sizes of no more than about 1.0$\mu$ and, more desirably, no more than about 0.5$\mu$ are particularly suitable. Herein, the term "microporous membrane" is used to refer to ultrafiltration membranes and microfiltration membranes collectively. By employing such relatively large pore microporous membranes, the membrane filtration operation in the present process can be carried out using transmembrane pressures of no more than about 100 psig, desirably no more than about 50 psig, and more commonly in the range of 10–20 psig.

The modified oilseed material formed by the present method can be used to produce protein supplemented food products such as confectionery compositions. The modified oilseed material can have a variety of characteristics that make it suitable for use as a protein source for incorporation into food products. A suitable modified oilseed material may include at least about 85 wt. % (dsb) protein, preferably at least about 90 wt. % (dsb) protein, and have one or more of the following characteristics: a $MW_{50}$ of at least about 200 kDa; at least about 40% of the material has an apparent molecular weight of greater than 300 kDa; at least about 40 wt. % of the protein in a 50 mg sample may be soluable in 1.0 mL water at 25° C.; a turbidity factor of no more than about 0.95; a 13.5% aqueous solution forms a gel having a breaking strength of no more than about 25 g; an NSI of at least about 80; at least about 1.4% cysteine as a percentage of total protein; a Gardner L value of at least about 85; a substantially bland taste; a viscosity slope of at least about 10 cP/min; an EOR of no more than about 0.75 mL; a melting temperature of at least about 87° C.; a latent heat of at least about 5 joules/g; a ratio of sodium ions to a total amount of sodium, calcium and potassium ions of no more than 0.5; no more than about 7000 mg/kg (dsb) sodium ions; and a bacteria load of no more than about 50,000 cfu/g.

A particularly desirable modified oilseed material formed by the present method which may be used to produce a protein supplemented food product may include at least about 85 wt. % (dsb) protein, preferably at least about 90 wt. % (dsb) protein, and meet one or more of the following criteria: a $MW_{50}$ of at least about 400 kDa; at least about 60% of the material has an apparent molecular weight of greater than 300 kDa; at least about 40 wt. % of the protein in a 50 mg sample may be soluable in 1.0 mL water at 25° C.; a turbidity factor of no more than about 0.95; a 13.5% aqueous solution forms a gel having a breaking strength of no more than about 25 g; an NSI of at least about 80; at least about 1.5% cysteine as a percentage of total protein; a Gardner L value of at least about 85; a substantially bland taste; a viscosity slope of at least about 50 cP/min; an EOR of no more than about 0.5 mL; a melting temperature of at least about 87° C.; a latent heat of at least about 5 joules/g; a ratio of sodium ions to a total amount of sodium, calcium and potassium ions of no more than 0.5; no more than about 7000 mg/kg (dsb) sodium ions; and a bacteria load of no more than about 50,000 cfu/g.

DETAILED DESCRIPTION

The modified oilseed material used to supplement the present confectionery compositions generally has a high protein content as well being light colored and having desirable flavor characteristics. The modified oilseed material can have a variety of other characteristics that make it suitable for use as a protein source for incorporation into foods for human and/or animal consumption.

The modified oilseed material can commonly be produced by a process which includes an extraction step to solubilize proteinaceous material present in an oilseed material and a subsequent purification of the extract using one or more microporous membranes to remove carbohydrates, salts and other non-protein components. Very often, the extract is clarified prior to membrane purification by at least removing a substantial amount of the particulate material present in the suspension produced by the extraction procedure.

The process described herein uses one or more microporous membranes to separate and concentrate protein from an oilseed extract. It is generally advantageous to use a microporous membrane which has a filter surface with a relatively low contact angle, e.g., no more than about 40 degrees. Microporous membranes with even lower contact angles, e.g., with filter surfaces having a contact angle of no more than about 30 degrees and in some instances of no more than about 15 degrees, are particularly suitable for use in the present method. The process commonly utilizes either relatively large pore ultrafiltration membranes (e.g., membranes with a molecular weight cut-off ("MWCO") of at least about 30,000) or microfiltration membranes with pore sizes up to about 2μ.

Source of Oilseed Material

The starting material employed in the present method generally includes material derived from defatted oilseed material, although other forms of oilseed based material may be employed. The fat may be substantially removed from dehusked oilseeds by a number of different methods, e.g., by simply pressing the dehusked seeds or by extracting the dehusked seeds with an organic solvent, such as hexane. The defatted oilseed material which is employed in preferred embodiments of the present process typically contains no more than about 3 wt. % and, preferably, no more than about 1 wt. % fat. The solvent extraction process is typically conducted on dehusked oilseeds that have been flattened into flakes. The product of such an extraction is referred to as an oilseed "white flake." For example, soybean white flake is generally obtained by pressing dehusked soybeans into a flat flake and removing a substantial portion of the residual oil content from the flakes by extraction with hexane. The residual solvent can be removed from the resulting white flake by a number of methods. In one procedure, the solvent is extracted by passing the oilseed white flake through a chamber containing hot solvent vapor. Residual hexane can then be removed from soybean white flakes by passage through a chamber containing hexane vapor at a temperature of at least about 75° C. Under such conditions, the bulk of the residual hexane is volatilized from the flakes and can subsequently be removed, e.g., via vacuum. The material produced by this procedure is referred to as flash desolventized oilseed white flake. The flash desolventized oilseed white flake is then typically ground to produce a granular material (meal). If desired, however, the flash desolventized oilseed white flake may be used directly in the present method.

Another defatted oilseed derived material which is suitable for use in the present process is derived from material obtained by removing the hexane from the oilseed white flake by a process referred to as toasting. In this process, the hexane extracted oilseed white flakes are passed through a chamber containing steam at a temperature of at least about 105° C. This causes the solvent in the flakes to volatilize and be carried away with the steam. The resulting product is referred to as toasted oilseed flake. As with flash desolventized oilseed white flake, toasted oilseed flake may be used directly in the present method or may be ground into a granular material prior to extraction.

While the desolventized oilseed white flake may be used directly in the extraction step, more commonly the desolventized flake is ground to a meal prior to being employed as starting material for the extraction. Oilseed meals of this type, such as soybean meal, are used in a wide variety of other applications and are readily available from commercial sources. Other examples of oilseed materials which are suitable for use in the culture medium include canola meal, sunflower meal, cottonseed meal, peanut meal, lupin meal and mixtures thereof. Oilseed materials derived from defatted soybean and/or defatted cottonseed are particularly suitable for use in the present method since such materials have a relatively high protein content. It is important to note that although many of the examples and descriptions herein are applied to a modified soybean material, the present method and material should not be construed to be so limited, and may be applied to other grains and oilseeds.

Extraction of Oilseed Material

The extraction of the protein fraction from oilseed material can be carried out under a variety of conditions using conventional equipment. Among the factors which affect the choice of process parameters and equipment are the efficiency of the extraction, effects on the quality of the protein in the extract and minimization of the environmental impact of the process. For cost and environmental reasons, one often would like to reduce the volume of water used in the process. The process parameters are also generally selected so as to minimize the degradation of protein, e.g., via indigenous enzymes and/or chemical reactions, as well as to avoid substantial bacterial contamination of the extract.

A variety of reactor configurations including stirred tank reactors, fluidized bed reactors, packed bed reactors may be employed in the extraction step. For example, the entire extraction reaction may be performed in a single vessel having appropriate mechanisms to control the temperature and mixing of the medium. Alternatively, the extraction may be carried out in multiple stages performed in separate reaction vessels.

As is common with many processes, the optimization of the various objectives typically requires a balancing in the choice of process parameters. For example, in order to avoid substantial chemical degradation of the protein, the extraction may be run at a relatively low temperature, e.g., about 15° C. to 40° C. and preferably about 20° C. to 35° C. Such temperatures, however, can be quite conducive to bacterial growth so that it may be best to minimize extraction times and/or conduct subsequent process operations at higher temperatures to reduce bacterial growth.

Alternately, the extraction may be run at slightly higher temperatures, e.g., 50° C. to 60° C., to reduce the chances of bacterial contamination. While this can reduce bacterial growth, the increased temperature can exacerbate potential problems due to chemical degradation of proteinaceous material. Thus, as for the extraction run at closer to room temperature, when the extraction is carried out at 50° C. to 60° C., it is generally desirable to complete the extraction as rapidly as possible in order minimize degradation of protein. When the extraction is run at temperatures between about 20° C. and 60° C., it has generally been found that extraction times of one to two hours are sufficient to allow high recoveries of protein while avoiding significant protein degradation and/or bacterial contamination. When higher temperatures are used, e.g., 50° C. to 60° C., it has been found that the extraction times of no more than about thirty minutes are commonly sufficient to allow high recoveries of protein while avoiding significant protein degradation and/or bacterial contamination. Use of higher temperatures is generally avoided since substantial exposure to temperatures of 60° C. and above can lead to protein solutions which have a tendency to gel during processing.

Although oilseed materials have been extracted under both acidic and basic conditions to obtain their proteinaceous material, the present method typically includes an extraction under basic conditions, e.g., using an alkaline solution having a pH of about 7.5 to about 10. Very often, the extraction is conducted by contacting the oilseed material with an aqueous solution containing a set amount of base, such as sodium hydroxide, potassium hydroxide, ammonium hydroxide and/or calcium hydroxide, and allowing the pH to slowly decrease as the base is neutralized by substances extracted out of the solid oilseed material. The initial amount of base is typically chosen so that at the end of the extraction operation the extract has a desired pH value, e.g., a pH within the range of 8.0 to 9.5. Alternately, the pH of the aqueous phase can be monitored (continuously or at periodic time intervals) during the extraction and base can be added as needed to maintain the pH at a desired value.

When the extraction is carried out as a single stage operation, the spent oilseed material is generally washed at least once with water or alkaline solution to recover proteinaceous material which may have been entrained in the solids fraction. The washings may either be combined with the main extract for further processing or may be used in the extraction of a subsequent batch of oilseed material.

The extraction operation commonly produces a mixture of insoluble material in an aqueous phase which includes soluble proteinaceous material. The extract may be subjected directly to separation via membrane filtration. In most cases, however, the extract is first clarified by removing at least a portion of the particulate matter from the mixture to form a clarified extract. Commonly, the clarification operation removes a significant portion and, preferably, substantially all of the particulate material. Clarification of the extract can enhance the efficiency of the subsequent membrane filtration operation and help avoid fouling problems with the membranes used in that operation.

The clarification can be carried out via filtration and/or a related process (e.g., centrifugation) commonly employed to remove particulate materials from the aqueous suspensions. Such processes do not, however, generally remove much of the soluble materials and thus the solubilized protein remains in the aqueous phase for further purification via membrane filtration. Because of the desire to achieve a high overall protein yield, the clarification step typically does not make use of filtration aids such as flocculants which could adsorb soluble proteinaceous material.

One suitable method of conducting the extraction and clarification operations employs a series of extraction tanks and decanter centrifuges to carry out a multi-stage counter current extraction process. This type of system permits highly efficient extractions to be carried out with a relatively low water to flake ratio. For example, this type of system can efficiently carry out extractions where the weight ratio of the aqueous extraction solution to the oilseed material in each phase is in the range of 6:1 to 10:1. Use of low water to flake ratios can enable the production of an oilseed extract which contains a relatively high concentration of dissolved solids, e.g., dissolved solids concentrations of 5 wt. % or higher and the production of extracts with at least about 7 wt. % solids is not uncommon. The use of low water to flake ratios and more concentrated extracts allows the process to be run in a system with lower volume capacity requirements, thereby decreasing demands on capital costs associated with the system.

If the system requirements in a particular instance do not include significant restrictions on overall volume, the extraction process may be carried using higher water to flake ratios. Where relatively high water to flake ratios are employed in the extraction operation, e.g., ratios of 20:1 to 40:1, it may be more convenient to carry out the extraction in a single stage. While these types of water to flake ratios will require systems capable of handling larger volumes of fluids (per pound of starting oilseed material), the higher dilution factor in the protein extraction can decrease the potential for fouling the microporous membrane(s) used in the membrane filtration operation.

Membrane Filtration

Extract liquor is transferred from the extraction system to a membrane separation system, generally by first introducing clarified extract into a membrane feed tank. The extract liquor commonly contains about 4.0–5.0% soluble protein and about 1.5–2.0% dissolved non-protein material. One purpose of the microfiltration operation is to separate protein from non-protein material. This can be accomplished by circulating the extract liquor through a set of microfiltration membranes. Water and the non-protein materials pass through the membrane as permeate while most of the protein is retained in the circulating stream ("retentate"). The protein-containing retentate is typically allowed to concentrate by about a 2.5–3× factor (e.g., concentration of 30 gallons of incoming crude extract by a 3× factor produces 10 gallons of retentate). The concentration factor can be conveniently monitored by measure the volume of permeate passing through the membranes. Membrane concentration of the extract by a 3× factor generally produces a retentate stream with dissolved solids containing at least about 80 wt. % protein (dsb). In order to increase the protein concentration to 90 wt. %, two 1:1 diafiltrations are typically carried out. In a diafiltration operation, water is added to the concentrated retentate and then removed through the microporous membranes. This can be carried out in the manner described above or, in an alternate embodiment of the present method, the diafiltration can be carried out at the initial stage of the membrane filtration, e.g., by continuously adding water to the incoming extract in a feed tank so as to substantially maintain the original volume.

The membrane filtration operation typically produces a retentate which is concentrated by at least a 2.5× factor, i.e., passing a volume of the extract through the filtration system produces a protein-enriched retentate having a volume of no more than about 40% of the original extract volume. The output from the membrane filtration operation generally provides a protein-enriched retentate which includes at least about 10 wt. % protein, and protein concentrations of 12 to 14 wt. % are readily attained.

For environmental and efficiency reasons, it is generally desirable to recover as much of the water from the membrane permeates as possible and recycle the recovered water back into the process. This decreases the overall hydraulic demand of the process as well as minimizing the volume of effluent discharged by the process. Typically, the diafiltration permeate is combined with the permeate from the concentration phase of the membrane filtration. The bulk of the water in the combined permeate can be recovered by separating the combined permeate with a reverse osmosis ("RO") membrane into an RO retentate and an RO permeate. RO separation can produce a permeate that is essentially pure water. This can be recycled back into earlier stages of the process. For example, the RO permeate can be used in an aqueous solution for extracting the oilseed material. The RO permeate can also be utilized in a diafiltration operation by diluting protein-enriched retentate with an aqueous diluent which includes the RO permeate.

The present process uses a membrane filtration system with one or more microporous membranes to separate and concentrate protein from the extract. It is generally advantageous to use a microporous membrane which has a filter surface with a relatively low contact angle, e.g., no more than about 40 degrees, as such membranes can provide efficient separation while exhibiting good resistance to fouling. Microporous membranes with even lower filter surface contact angles (i.e., surfaces having greater hydrophilicity) are particularly suitable for use in the present process. Such membranes may have a filter surface with a contact angle of 25 degrees or less and some membranes may have a filter surface contact angle of no more than about 10 degrees.

As used herein, the term "contact angle" refers to contact angles of surfaces measured using the Sessile Drop Method. This is an optical contact angle method used to estimate the wetting property of a localized region on a surface. The angle between the baseline of a drop of water (applied to a flat membrane surface using a syringe) and the tangent at the drop boundary is measured. An example of a suitable instrument for measuring contact angles is a model DSA 10 Drop Shape Analysis System commercially available from Kruss.

The membranes should be capable of retaining a high percentage of the medium and high molecular weight protein components present in the extract while allowing water and other components to pass through the membrane. The membrane filtration operation commonly utilizes either relatively large pore ultrafiltration membranes (e.g., membranes with a molecular weight cut-off ("MWCO") of at least about 30,000) or microfiltration membranes with pore sizes up to about 1.5$\mu$. Low contact angle microfiltration membranes with MWCOs of 25,000 to 200,000 are particularly suitable for use in the present process. Particular examples of suitable microporous membranes in modified PAN membranes with a filter surface contact angle of no more than about 25 degrees and an MWCO of 30,000 to 100,000. To be useful in commercial versions of the process, the membranes should be capable of maintaining substantial permeation rates, e.g, allowing roughly 1500 to 3000 mL/min to pass through a membrane module containing circa 12 sq. meters of membrane surface area. By employing such relatively large pore microporous membranes, the membrane filtration operation can generally be carried out using membrane back pressures of no more than about 100 psig. More preferably the membrane back pressure is no more than about 50 psig and efficient membrane separation has been achieved with back pressures in the range of 10–20 psig.

The membrane filtration system is generally configured to run in a cross-flow filtration mode. Because larger particles and debris are typically removed by the earlier clarification operation, the microporous membrane tends not to become clogged easily. Inclusion of the clarification step upstream in the process tends to result in longer membrane life and higher flux rates through the membrane. The membrane filtration system typically employs one or more interchangeable membrane modules. This allows membrane pore size (or MWCO) and/or membrane type to be altered as needed and allows easy replacement of fouled membranes.

Cross-flow filtrations can be run either continuously or in batch mode. Cross-flow membrane filtration can be run in a variety of flow configurations. For example, a tubular configuration, in which the membranes are arranged longitudinally in tubes similar to the tubes in a shell and tube heat exchanger, is one common configuration since it allows processing of solutions which include a variety of particle sizes. A number of other conventional cross-flow configurations, e.g., flat sheet and spiral wound, are known to provide effective membrane separations while reducing fouling of the membrane. Spiral wound cross-flow membrane systems are particularly suitable for use in the present processes, especially where the feed solution contains relatively little particulate matter, such as a clarified oilseed extract. Spiral wound membrane modules tend to provide highly efficient separations and permit the design of filtration systems with large membrane surface areas in a relatively compact space.

As with the extraction operation, the temperature of the protein-containing solution during the membrane filtration operation can affect the chemical state of the protein (e.g., via degradation and/or denaturation) as well as the amount of bacterial contamination which occurs. Lower temperatures tend to minimize chemical degradation of the protein. However, at lower temperatures bacterial growth can be a problem and the viscosity of more concentrated protein solutions (e.g., solutions with at least about 10 wt. % protein) can present processing problems. The present inventors have found that maintaining the protein-containing extract at about 55 to 60° C. while conducting the membrane separation can effectively suppress bacterial growth while minimizing changes in protein functionality due to chemical degradation/denaturation. It appears that any substantial exposure to higher temperatures can cause changes in the protein which can make concentrated solutions more prone to gelling, e.g., during a subsequent spray drying operation.

When the membrane filtration is run as a batch operation, the membranes are generally cleaned in between each run. Typically the membrane system will have been cleaned and sanitized the day before a run and the membranes will be stored in a sodium hypochlorite solution. Before use, the membrane system the hypochlorite solution is then drained out of the membrane system and the entire system is rinsed with water. When the membrane separation is carried out as a continuous operation, the membranes are commonly shut down at periodic intervals and cleaned in a similar fashion.

A variety of methods are known for cleaning and sanitizing microporous membrane systems during ongoing use. One suitable cleaning procedure includes sequentially flushing the membrane with a series of basic, acidic and sanitizing solutions. Examples of suitable sanitizing solutions include sodium hypochlorite solutions, peroxide solutions, and surfactant-based aqueous sanitizing solution. Typically, the membrane is rinsed with water between treatments with the various cleaning solutions. For example, it has been found that membranes with a low contact angle filtering surface (e.g., modified PAN microporous membranes) can be effectively cleaned by being flushed with the following sequence of solutions:

1) Water;
2) Caustic solution (e.g., 0.2 wt. % NaOH solution);
3) Water;
4) Mild acid solution (e.g., aqueous solution with a pH 5.5–6);
5) Surfactant-based aqueous sanitizing solution (Ultra-Clean™; available from Ecolab, St. Paul, Minn.); and
6) Water.

The cleaning sequence is commonly carried out using room temperature solutions. If the membrane is significantly fouled, it may be necessary to carry out one or more of the rinsing steps at an elevated temperature, e.g., by conducting the caustic, acidic and/or sanitizing rinse at a temperature of about 40° C. to 50° C. In some instances, the effectiveness of the cleaning sequence can be enhanced by using a more strongly acidic rinse, e.g., by rinsing the membrane with a acidic solution having a pH of about 4 to 5. Other types of solutions can be used as a sanitizing solution. For example, if the membrane is sufficiently chemically inert, an oxidizing solution (e.g., a dilute solution of NaOCl or a dilute hydrogen peroxide solution) can be used as a sanitizing agent. After the final water rinse in the cleaning sequence, the membrane can be used immediately to effect the membrane separation of the present process. Alternatively, the membrane can be stored after cleaning. It is common to store the cleaned membrane in contact with a dilute bleach solution and then rinse the membrane again with water just prior to use.

By selecting a membrane which can be effectively cleaned (e.g., a membrane with low contact angle filtering surface such as a modified PAN membrane) it is possible to carry out membrane filtration of concentrated oilseed protein extracts which produce retentates having relatively low bacterial levels. For example, by employing a modified PAN membrane and a cleaning procedure similar to that outlined above, it is possible to produce spray dried protein concentrates having a total bacterial plate count of no more than about 300,000 cfu/g and, desirably, no more than about 50,000 cfu/g without subjecting the retentate to pasteurization (e.g., via HTST treatment).

Downstream Processing of Retentate

The retentate produced by the membrane filtration operation is often pasteurized to ensure that microbial activity is minimized. The pasteurization generally entails raising the internal temperature of the retentate to about 75° C. or above and maintaining that temperature for a sufficient amount of time to kill most of the bacteria present in the solution, e.g., by holding the solution at 75° C. for about 10–15 minutes. The product commonly is pasteurized by subjecting the concentrated retentate to "HTST" treatment. The HTST treatment can be carried out by pumping the concentrate retentate through a steam injector where the protein-containing concentrate is mixed with live steam and can be heated rapidly to about 80–85° C. (circa 180° F.). The heated concentrate is then typically passed through a hold tube, under pressure, for a relatively short period of time, e.g., 5 to 10 seconds. After the hold tube, the heated retentate can be cooled by passage into to a vacuum vessel. The evaporation of water from the retentate under vacuum results in flash cooling of the heated solution, allowing the temperature to be rapidly dropped to the range of 45–50° C. (circa 130–140° F.). This type of treatment has been found to be very effective at destroying bacteria while avoiding substantial chemical degradation of the protein.

To improve its storage properties, the modified oilseed product is typically dried such that the product contains no more than about 12 wt. % moisture, and preferably, no more than about 8 wt. % moisture, based upon the weight of the final dried product. Depending on the drying method utilized and the form of the dried product, after drying the product may be ground into free-flowing solid particles in order to facilitate handling and packaging. For example, if the dried, modified oilseed product is dried into a cake, it can be ground into a dried powder, preferably such that at least about 95 wt. % of the material is in the form of particles having a size of no more than about 10 mesh.

In an alternate process, after pH adjustment to a neutral pH, the liquid retentate may be spray dried to form a dry powdered product. The spray dried product is preferably dried to a water content of no more than about 10 wt. % water and, more preferably, about 4–6 wt. % water. The retentate can be spray dried by passing a concentrated solution (e.g., circa 10–15 wt. % solids) of the retentate through a spray dryer with a dryer inlet temperature of about 160–165° C., a feed pump pressure of about 1500 psig and a discharge air temperature of about 90–95° C.

Before the heating which can occur as part of either the spray drying or HTST treatment, it is usually advantageous to adjust the pH of the sample to about neutral. For example, the pH of the retentate is often adjusted to between 6.5 to 7.5 and, preferably between 6.7 and 7.2 prior to any further treatment which involves heating the sample. Heating the concentrated retentate can alter the molecular weight profile and consequently the functionality of the product. Compare, for example, the molecular weight profile of the product of Example 2 which was not heat treated with that of the product produced according to Example 1. The heat treated material contains a number of proteins not present its heated treated counterpart, the product of Example 1. The DSC's of these two samples also show a distinct difference. The material produced according to Example 2 shows a relatively sharp, symmetrical peak at about 93° C. The other material which was not heat treated, that of Example 4, also shows a strong absorption of energy at about 93° C. All of the commercial products show either no absorption peak at all or small relatively weak absorption peak at about 82° C. DSC scans of the two heat treated products formed by the present method (Examples 1 and 3) also only show a relatively weak absorption peak at about 82° C.

In some instances, it may be advantageous to concentrate the retentate produced by the membrane filtration operation prior to a final spray drying step. This can be accomplished using conventional evaporative techniques, generally with the aid of vacuum to avoid extensive heating of the processed soy protein material. Where a concentration step of this type is included in the process, it normally occurs after the pH of the retentate has been adjusted to a neutral pH (e.g., a pH of roughly 6.8–7.0).

Characteristics of Modified Oilseed Material

The modified oilseed material can be derived from a variety of precursor oilseed materials, such as soybean meal, canola meal, sunflower meal, cottonseed meal, peanut meal, lupin meal or mixtures thereof. Soy bean flake or meal are particularly suitable sources of oilseed protein to utilize in the present method. The modified oilseed material can have a variety of characteristics that make it suitable for use as a protein source for incorporation into foods for human and/or animal consumption.

The modified oilseed material can be used to produce protein supplemented food products for human consumption. Examples of protein supplemented food products include beverages, processed meats, frozen desserts, confectionery products, dairy-type products, sauce compositions, and cereal grain products. The amount of modified oilseed material used to supplement a food product can vary greatly depending on the particular food product. A typical protein supplemented food product may have between 0.1 and 10 wt. %. The modified oilseed material may be used to produce additional food products. It is also important to note that the food products may be grouped into different or additional food categories. A specific food product may fall into more than one category (e.g., ice cream may be considered both a frozen dessert and a dairy-type product). The food products provided herein are for illustrative purposes only and are not meant to be an exhaustive list.

Examples of protein supplemented confectionery products include chocolates, mousses, chocolate coatings, yogurt coatings, cocoa, frostings, candies, energy bars, and candy bars.

Consideration of the characteristics of the modified oilseed material is often important in developing a particular protein supplemented food product. For example, dispersability can facilitate easy mixing of the ingredients (whether a dry formulated mix or the dry isolates) into water, ideally leading to a relatively stable homogenous suspension. Solubility may be desired to reduce the amount of particulates that can be found in finished beverages. Suspendability may be desired to prevent the settling of the insoluble components from the finished formula upon standing. Generally, a white colored modified oilseed material is preferred as tan and brown solutions can be difficult to color into white (milk-like) or brightly colored (fruit-like) colors. Clarity of modified oilseed material in solution can also be an important beverage characteristic. Foaming, although usually undesired in beverages as it can complicate mixing, can also be a positive characteristic in some products (e.g., milk shake-like products). Other characteristics that can be important for particular food compositions include molecular weight, gelling capability, viscosity, emulsion stability fact content and amino acid content. Specific properties according to one or more of these characteristics may be advantageous in developing protein supplemented food products.

The protein supplemented confectionery composition typically includes a sweetener and a modified oilseed material, which includes at least about 85 wt. % and, more desirably, at least about 90 wt. % protein on a dry solids basis. Examples of suitable sweeteners include honey, corn syrup, sucrose, dextrose and lactose. The confectionery composition often also includes a triacylglycerol component, e.g., vegetable oil and/or hydrogenated vegetable oil. Examples of suitable triacylglycerol components include soybean oil, palm kernel oil, fractionated and/or hydrogenated versions of such oils, and mixtures thereof.

The modified oilseed material formed by the present method typically includes a high percentage of high molecular weight proteins and is less contaminated with low molecular weight proteins. A suitable method to analyze the content of high molecular weight proteins found in the material is based on chromatographic data as described in Example 16.

The raw chromatogramic data may be used to calculate a number of different metrics. One metric is to calculate the molecular weight at which 50% of the mass is above and 50% of the mass is below. This first metric is not precisely the mean molecular weight, but is closer to a weighted average molecular weight. This is referred to herein by the term "$MW_{50}$." Another metric is to calculate the wt. % of modified oilseed material that has an apparent molecular weight that is greater than 300 kDa. Yet another metric is to calculate the wt. % of modified oilseed material that has an apparent molecular weight that is less than 100 kDa. Any one of these three metrics may be used individually to characterize the molecular weight of a particular modified oilseed material. Alternatively, combinations of two or more of these metrics may be used to characterize the molecular weight profile of a modified oilseed material.

Preferably, the modified oilseed material formed by the present method has a $MW_{50}$ of at least about 200 kDa. More preferably, at least about 400 kDa. Modified oilseed material that has a $MW_{50}$ of at least about 600 kDa can be particularly suitable for some applications. As for the second metric mentioned above, at least about 40% of a suitable modified oilseed material may have an apparent molecular weight of greater than 300 kDa. For some applications, it may be desirable if at least about 60% of the modified oilseed material has an apparent molecular weight of greater than 300 kDa. According to the third metric mentioned above, preferably no more than about 40% of the modified oilseed material has an apparent molecular weight of less than 100 kDa. For some applications, however, preferably no more than about 35% of the modified oilseed material has an apparent molecular weight of less than 100 kDa. A suitable modified oilseed material may meet the preferred values of one or more of these three metrics. For example, a particularly suitable modified oilseed material may have a $MW_{50}$ of at least about 200 kDa and at least about 60% of the modified oilseed material has an apparent molecular weight of greater than 300 kDa. Modified oilseed material that has a $MW_{50}$ at least about 600 kDa and at least about 60% of the modified oilseed material has an apparent molecular weight of greater than 300 kDa can be formed by the present method.

The modified oilseed material formed by the present method typically includes a protein fraction with good solubility. For example, modified oilseed material where at least about 40 wt. % of the protein in a 50 mg sample of the material is soluble in 1.0 mL water at 25° C. can be formed by the present method. Samples in which at least about 50 wt. % of the protein is soluble under these conditions are attainable. The solubility of a modified oil seed material can also be described by its NSI as discussed in Example 9.

In addition to having relatively good solubility, the modified oilseed material formed by the present method often has good properties with respect to its suspendability in aqueous solutions. For example, the present process can be used to provide modified oilseed material which has good suspendability. One measure of the suspendability of a dried oilseed protein product is its "turbidity factor." As used herein, the "turbidity factor" is defined in terms of the assay described in Example 14. As described in this example, sufficient sample to make a 5 wt. % solution is dissolved/dispersed in a 5 wt. % sucrose solution. After standing for about 1 hour at room temperature, an aliquot of the slurry is diluted 10-fold into water and the absorbance at 500 nm was measured. This absorbance measurement at 500 nm (referred to herein as the "turbidity factor") is a measure of turbidity with higher absorbance values indicating higher turbidity and lower solubility.

Preferably, the modified oilseed material formed by the present method has an absorbance at 500 nm of no more than about 0.95 in this assay, i.e., a turbidity factor of no more than about 0.95. Stated otherwise, a dispersion of 0.5 wt. % of the dried oilseed protein product in a 0.5 wt. % aqueous sucrose solution has an absorbance at 500 nm of no more than about 0.95 (after standing for about one hour as a 5 wt. % solution in a 5 wt. % sucrose solution).

The present method allows the production of modified oilseed materials which have desirable color characteristics. The products generally have a very light color as evidenced by their Gardner L values. For example, the present method allows the preparation of modified oilseed materials which have a dry Gardner L value of at least about 85. In some instances, e.g., by running the extraction at a weakly alkaline pH of 8–9 and conducting the initial extraction at a relatively low temperature (circa 25–35° C.; 75–95° F.), it may be possible to produce a sample of an oilseed protein isolate which has a Gardner L value (dry) of at least about 88.

The present method further allows the production of modified oilseed material which has desirable flavor characteristics. An undesirable flavor is often one of the biggest hindrances to the use of modified oilseed material in a consumer product. The flavor of modified oilseed material, especially modified soy protein, is derived from a complex mixture of components. For example, bitterness and other off flavors are often caused by the presence of low molecular weight peptides (400<MW<2000) and volatile compounds. Some of these small molecules arise in the oilseed itself and others are bound to the modified oilseed material at various points in the production process. The substantially bland taste which is typical of the modified oilseed materials formed by the present method, may be due to fewer small molecular weight peptides and volatile compounds.

For some food related applications the ability of a modified oilseed material to form a gel can be an important functional characteristic. In gelling, the protein denatures to form a loose network of protein surrounding and binding a large amount of water. As used herein, the term "gel strength" refers to the breaking strength of a 12.5 wt. % aqueous solution of the modified oilseed material after setting and equilibrating the gel at refrigerator temperature (circa 4–5° C.). Modified oilseed materials formed by the present method may have a gel strength of no more than about 25 g.

The modified oilseed material formed by the present method typically demonstrate desirable viscosity properties. A modified oilseed material that provides a thinner solution under one set of parameters is advantageous in applications like meat injection where thinner solutions can more easily be injected or massaged into meat products. Typically, a modified oilseed material that does not show thinning upon heating is generally preferred. For some applications, it is a desirable property to be able to maintain viscosity through heating cycles. The modified oilseed material formed by the present method increases viscosity with heating so its hold on water is improving during the early stage of cooking. In contrast, most commercial samples decrease in viscosity early in cooking and decrease their hold on the water.

Upon heating, protein molecules vibrate more vigorously and bind more water. At some point, the molecules lose their native conformation and become totally exposed to the water. This is called gelatinization in starch and denaturation in proteins. Further heating can decrease viscosity as all interactions between molecules are disrupted. Upon cooling, both types of polymers can form networks with high viscosity (called gels). For some food related applications the ability of a modified oilseed material to form a gel can be an important functional characteristic. Rapid viscosity analysis ("RVA") was developed for analysis of starchy samples and is generally similar to Braebender analysis. Given the analogy between starch and protein systems, one can apply the RVA analysis described in Example 11 to the modified oilseed materials formed by the present method.

According to the method described in Example 11, one can measure the slope of the viscosity line over the temperature increase from 45° C. to 95° C., herein referred to as the "viscosity slope." A suitable modified oilseed material may have a viscosity slope of at least about 30. A particularly suitable modified oilseed material may have a viscosity slope of at least about 50. As shown in Table 3, modified oilseed materials formed by the present method showed a viscosity slope of at least about 70.

For some food related applications the ability of a modified oilseed material to form an emulsion can be an important functional characteristic. Oil and water are not miscible and in the absence of a material to stabilize the interface between them, the total surface area of the interface will be minimized. This typically leads to separate oil and water phases. Proteins can stabilize these interfaces by denaturing onto the surface providing a coating to a droplet (whether of oil or water). The protein can interact with both the oil and the water and, in effect, insulate each from the other. Large molecular weight proteins are believed to be more able to denature onto such a droplet surface and provide greater stability than small proteins and thereby prevent droplet coalescence.

Emulsion stability may be determined based according to the procedure described in Example 12. According to this procedure, a sample is analyzed according to the amount of oil released from the emulsion. As used herein, the term "Emulsion Oil Release," or "EOR" refers to the amount of oil released (in mL) from the emulsion according to the conditions of the assay described in Example 12. Modified oilseed protein products prepared by the present method commonly form relatively stable emulsions. Typically, in the absence of centrifugation essentially no oil will separate from the emulsions within 2–3 hours. After the centrifugation procedure described in Example 12, a suitable material may have an EOR of no more than about 0.75 mL. Stated otherwise no more than about 0.75 mL of oil may be released from the emulsion. A particularly suitable emulsion may have an EOR of no more than about 0.5 mL, and more desirably, no more than about 0.3 mL after centrifugation.

During the membrane purification operation, while the levels of some components of the modified oilseed material are altered considerably, the fat content (measured after acid hydrolysis) in the present modified oilseed material remains relatively unchanged. Thus, if the oilseed material is substantially made up of material derived from defatted soybean flakes, the modified product obtained from the present process typically has a fat content of about 1 to 3 wt. % (dsb). For example, processing of defatted oilseed material, such as soybean meal, by the present method can produce a modified oilseed product having a protein content of 90 wt. % (dsb) or greater with no more than about 3 wt. % (dsb) and preferably, no more than about 2 wt. % fat. As used herein, the term "fat" refers to triacylglycerols and phospholipids.

The amino acid composition of a modified oilseed material may not only be important from a nutritional perspective, but it may also be an important part of determining the functional behavior of the protein. The amino acid content of a modified oilseed material may be determined by a variety of known methods depending on the particular amino acid in question. For example, cysteine may be analyzed after hydrolysis with performic acid according to known methods. To compare materials with different protein contents, compositions may be recalculated to a 100% protein basis. Typically, one would expect the amino acid composition of materials derived from a common starting material to be very similar. However, direct comparison of the average compositions shows that the modified oilseed materials formed by the present method includes more cysteine (assayed as cystine) than the commercial samples tested. For example, a suitable modified oilseed material may include at least about 1.35 wt. % cysteine as a percentage of total protein. A particularly suitable material may include at least about 1.5 wt. % cysteine as a percentage of total protein.

Cysteine can play an important role in nutrition and is one of the 10 essential amino acids. Cysteine may also play a role in the stabilization of the native structure of soy proteins. If oxidation-reduction reagents are used to "restructure" soy proteins, the cysteines may be damaged as an unintended consequence. Loss of native structure might remove some of the protection of the cysteine, making damage to the native structure more likely. As shown in Example 18, commercial materials show a substantial loss of native structure as measured by molecular weight and differential scanning calorimetry.

The modified oilseed material formed by the present method can have a variety of characteristics that make it suitable for use as a protein source for incorporation into food products for human and/or animal consumption. A suitable modified oilseed material may include at least about 85 wt. % (dsb) protein, preferably at least about 90 wt. % (dsb) protein. A suitable modified oilseed material may also have a $MW_{50}$ of at least about 200 kDa and/or at least about 40% of the material has an apparent molecular weight of greater than 300 kDa. The modified oilseed material may also have one or more of the following characteristics: at least about 40 wt. % of the protein in a 50 mg sample may be soluable in 1.0 mL water at 25° C.; a turbidity factor of no more than about 0.95; a 13.5% aqueous solution forms a gel having a breaking strength of no more than about 25 g; an NSI of at least about 80; at least about 1.4% cysteine as a percentage of total protein; a Gardner L value of at least about 85; a substantially bland taste; a viscosity slope of at least about 10; an EOR of no more than about 0.75 mL; a melting temperature of at least about 87° C.; a latent heat of at least about 5 joules/g; a ratio of sodium ions to a total amount of sodium, calcium and potassium ions of no more than 0.5; no more than about 7000 mg/kg (dsb) sodium ions; and a bacteria load of no more than about 50,000 cfu/g.

A particularly desirable modified oilseed material formed by the present method which may be used to produce a protein supplemented food product may include at least about 85 wt. % (dsb) protein, preferably at least about 90 wt. % (dsb) protein, and meet one or more of the following criteria: a $MW_{50}$ of at least about 400 kDa; at least about 60% of the material has an apparent molecular weight of greater than 300 kDa; at least about 40 wt. % of the protein in a 50 mg sample may be soluable in 1.0 mL water at 25° C.; a turbidity factor of no more than about 0.95; a 13.5% aqueous solution forms a gel having a breaking strength of no more than about 25 g; an NSI of at least about 80; at least about 1.5% cysteine as a percentage of total protein; a Gardner L value of at least about 85; a substantially bland taste; a viscosity slope of at least about 50; an EOR of no more than about 0.5 mL; a melting temperature of at least about 87° C.; a latent heat of at least about 5 joules/g; a ratio of sodium ions to a total amount of sodium, calcium and potassium ions of no more than 0.5; no more than about 7000 mg/kg (dsb) sodium ions; and a bacteria load of no more than about 50,000 cfu/g.

The following examples are presented to illustrate the present invention and to assist one of ordinary skill in making and using the same. The examples are not intended in any way to limit the scope of the invention.

EXAMPLE 1

Extractions were carried out batchwise in a 50 gallon stainless steel tank. This batch size utilized 30 lbs of white flakes and 30 gallons of water. This allowed the extract batch to be extracted and centrifuged in no more than about 2 hours with laboratory scale equipment. The amount of bacteria growth which occurs during the extraction operation can be minimized by limiting the amount of time needed to carry out the extraction and centrifugation operations.

The extraction tank, centrifuge, centrifuge filter cloth and all utensils were sanitized with hot water and sodium hypochlorite (NaOCl) prior to use. City water (28.8 gal) at 80° F. (27° C.) was introduced into the extraction tank. After the extraction tank agitator was started, 30 lbs of soy white flakes were introduced into the extraction tank. The pH of the resulting slurry was adjusted by adding a solution of 92 grams of sodium hydroxide dissolved in 400 mL city water. The slurry was then stirred at room temperature for 30 minutes. The pH of the suspension is recorded at the beginning and end of the extraction process. The initial pH of the aqueous phase of the slurry was about 9.0. After stirring for 30 minutes, the pH of the extract was typically about 8.4 to 8.5.

A Sharples basket centrifuge was then started with the bowl set to 1800 rpm. The extracted slurry was manually fed to the centrifuge at a rate of about 0.5 gpm. Clarified extract liquor was collected and transferred to the microfiltration feed tank. When the centrifuge basket was full of spent flakes (after approximately 90 lbs of feed slurry), the cake is washed with 4000 ml (circa 9 lbs) of city water. The centrifuge was then stopped and the spent flakes were discarded. After rinsing the centrifuge and washing the filter cloth, the centrifuge was restarted and the extraction sequence repeated until all of the slurry in the extraction tank had been separated. The clarified extract contained about 4.0–5.0% soluble protein and 1.5–2.0% dissolved non-protein material and had a pH of about 7.5 to 7.8.

After about 150 lbs of extract solution was transferred from the extraction system to the membrane feed tank, the extract liquor was recirculated at a flow rate of about 9 gpm through a heater system which bypassed the membranes. The water temperature of the hot water bath in the heater system was set at 140° F. (60° C.). This is a temperature which had been shown to retard bacteria growth in the clarified extract (see Example 2).

After all of the extract liquor has been transferred to the membrane feed tank, the extract liquor at 140° F. was recirculated over the membranes at 15 gpm with the membrane back pressure set at 10 psig. The membrane filtration system contained four modified PAN membranes with a nominal 50,000 MWCO (MX-50 membranes available from Osmonics, Minnetonka, Minn.) arranged in series. The total filtration surface area of the array of membranes was about 12 sq. meters.

The membrane permeate was collected and monitored by weighing the amount of permeate collected. After being weighed, the permeate was discarded. When the amount of permeate collected equaled 67% of original total weight of the clarified extract, the protein in the retentate had been concentrated by a 3× factor, from about 4% to about 12%. During the initial concentration phase of the membrane filtration, the permeate flux typically varied from an initial rate of about 2600 ml/min to about 1500 ml/min during the later stages of the concentration.

At this point the concentration operation was stopped by closing the permeate valves and opening the back-pressure valve on the membrane. For the first diafiltration step, 140° F. (60° C.) water was added to the retentate in the membrane feed tank in an amount equal to the weight of the retentate after the concentration step. In other words, sufficient water ("diafiltration water") was added to lower the protein concentration by a factor of 2× (i.e., the volume of the retentate was doubled by the addition of the water). The permeate valves were then opened and the back-pressure on the membranes was again set to 10 psig. The permeate was collected and weighed before discarding. When the weight of the diafiltration permeate was equal to the weight of the diafiltration water, the first diafiltration was complete. The diafiltration operation was then repeated a second time. After the second diafiltration had been completed, the solids in the retentate normally contained about 90 to 93% wt protein.

After the second diafiltration, the retentate from the membrane system was transferred to a mixing tank. The membrane system was flushed with 7 gallons of city water to recover additional protein from the system. This flush water was combined with the retentate in the mixing tank. Prior to the next operation, the pH of the retentate was adjusted to 6.8 to 7.0 with dilute HCl.

Following pH adjustment, the retentate was subjected to treatment at a relatively high temperature for a short time ("HTST") in order to pasteurize the retentate. The HTST step consists of pumping the concentrate at 1 gpm to a steam injector. In the steam injector, the concentrate is mixed with live steam and heated instantly to 280° F. The heated concentrate passes through a hold tube, under pressure, for 5 seconds. After the hold tube, the product flows in to a vacuum vessel where the product is flash cooled to 130° F. The product is then spray dried. The HTST step is very effective in killing bacteria, even thermophiles. Total plate counts could be reduced from as high as 300,000 cfu/g to around 100 cfu/g after the HTST operation.

The HTST treated material was then spray dried to yield a soy protein product which contained circa 90–93 wt. % protein (dry solids basis) and had a water content of about 6 wt. %. The spray dried soy protein product had an average particle size of about 20 microns and had a water content of about 8–9 wt. %.

EXAMPLE 2

Batches (30 lbs) of soy white flakes were extracted and processed according to the procedure in Example 1 except that after pH adjustment (to pH 6.8–7.0) the retenate was not subjected to HTST treatment. Instead, following pH adjustment, the retenate was spray dried using the procedure described in Example 1 to yield a soy protein product. The spray dried soy protein product had an average particle size of about 20 microns and a total bacterial count of no more than about 50,000 cfu/g.

EXAMPLE 3

Batches (30 lbs) of soy white flakes were extracted and processed according to the procedure described in Example 1. At the beginning of the extraction the pH of the resulting slurry was adjusted by adding a solution of 165 grams of sodium hydroxide dissolved in 1,000 mL city water. The initial pH of the aqueous phase of the slurry was about 9.8 and after stirring for 30 minutes, the pH of the extract was about 9.5. After pH adjustment (to pH 6.8–7.0), the retentate was subjected to treatment at a relatively high temperature for a short time ("HTST") in order to pasteurize the retentate using the procedure described in Example 1. The HTST treated material was then spray dried using the procedure described in Example 1 to yield a soy protein product. The spray dried soy protein product had an average particle size of about 20 microns, contained circa 88–89 wt. % protein (dry solids basis) and had a water content of about 8–9 wt. %.

EXAMPLE 4

Batches (30 lbs) of soy white flakes were extracted and processed according to the procedure in Example 1 except that at the beginning of the extraction the pH of the resulting slurry was adjusted by adding a solution of 165 grams of sodium hydroxide dissolved in 1,000 mL city water. The initial pH of the aqueous phase of the slurry was about 9.8 and after stirring for 30 minutes, the pH of the extract was about 9.5. Following membrane filtration and pH adjustment, the retentate was spray dried to yield a soy protein product which contained circa 90 wt. % protein (dry solids basis) and had a water content of 8–9 wt. %. The spray dried soy protein product had an average particle size of about 20 microns and a total bacterial count of no more than about 50,000 cfu/g.

EXAMPLE 5

Extractions were carried out in an 80 gallon agitated stainless steel tank. One pound per minute of soy white flakes were mixed continuously with 2.4 gpm of city water. Caustic soda (NaOH) was added to the tank to control the pH in the tank at 8.5. The temperature in the tank was controlled at 130° F. The average extraction retention time of 25 min. was maintained by controlling the discharge rate of the tank. Slurry was pumped continuously from the extraction tank to a decanter centrifuge where the slurry was separated into two streams; a protein rich liquor stream and a spent flake stream.

The extraction tank, centrifuge and interconnecting piping were cleaned with a 0.75% caustic solution and sanitized with a 500 ppm sodium hypochlorite (NaOCl) solution prior to use.

Extract liquor was pumped to an A or B Membrane Feed Tank. The extract liquor contains about 3.0% protein. The A and B Membrane systems are used to separate the protein from the soluble carbohydrates using ultrafiltration membranes. After about 100 gallons of extract solution was transferred from the extraction system to the membrane feed tank, the extract liquor was recirculated at an approximate flow rate of about 80 gpm through the membrane system. The temperature of the extract liquor was controlled at 140° F. (60° C.) with an in-line heat exchanger. A total of 300 gallons of extract liquor was transferred to a membrane feed tank.

After all of the extract liquor has been transferred to the membrane feed tank, the extract liquor held at 140° F. (60° C.) was recirculated over the membranes at 80 gpm with the membrane back pressure controlled at 10–20 psig. The membrane filtration system contained six modified PAN membranes with a nominal 50,000 MWCO (MX-50 membranes available from Osmonics, Minnetonka, Minn.). The total filtration surface area of the array of membranes was approximately 1260 sq. feet.

During the initial concentration phase of the membrane filtration, the permeate flux typically varied from an initial rate of about 2.5 gpm to about 1.5 gpm during the later stages of the concentration. During this step the protein was concentrated from 3% to about 10%.

After the initial concentration phase, 100 gallons of 140° F. (60° C.) water was added to a Membrane Feed Tank, which dilutes the protein down to about 3.3%. The protein was then concentrated back up to 10% solids. This is called the diafiltration step. Two diafiltration steps were used to increase the protein content of the solids, in the concentrate stream, up to 90% minimum. During this run the permeate from the membrane system was discarded.

After the second diafiltration, the retentate from the membrane system was transferred to a dryer feed tank. The membrane system was flushed with 30 gallons of city water to recover additional protein from the system. This flush water was combined with the retentate in the dryer feed tank. Prior to the next operation, the pH of the retentate was adjusted to 6.8 to 7.0 with dilute HCl.

Following pH adjustment, the retentate was subjected to treatment at a relatively high temperature for a short time ("HTST") in order to pasteurize the retentate. The HTST step consists of pumping the concentrate at 2 gpm to a steam injector. In the steam injector, the concentrate is mixed with live steam and heated instantly to 280° F. (138° C.). The heated concentrate passes through a hold tube, under pressure, for 10 seconds. After the hold tube, the product flows in to a vacuum vessel where the product is flash cooled to 130° F. (54° C.). The product is then spray dried. The HTST step is very effective in killing bacteria, even thermophiles. Total plate counts could be reduced from as high as 300,000 cfu/g to around 100 cfu/g after the HTST operation.

The HTST treated material was then spray dried to yield a soy protein product having an average particle size of about 80 microns, contained circa 90 wt. % protein (dsb) and a water content of about 8–9 wt. %.

EXAMPLE 6

Batches (240 lbs) of soy white flakes were extracted and processed according to the procedure in Example 5 except that after pH adjustment (to pH 6.8–7.0) the retentate was not subjected to HTST treatment. Instead, following pH adjustment, the retenate was spray dried according to the procedure described in Example 5 to yield a soy protein product which contained circa 90–93 wt. % protein (dry solids basis) and had a water content of about 6 wt. %. The spray dried soy protein product had an average particle size of about 80 microns and a total bacterial count of no more than about 50,000 cfu/g.

EXAMPLE 7

Batches (240 lbs) of soy white flakes were extracted and processed according to the procedure described in Example 5 except that the pH of the slurry in the extraction tank was controlled at 9.5. As in Example 5, following pH adjustment (to pH 6.8–7.0), the retentate was subjected to HTST treatment in order to pasteurize the retentate. The HTST treated material was then spray dried according to the procedure in Example 5 to yield a soy protein product. The spray dried soy protein product had an average particle size of about 80 microns, contained circa 88–89 wt. % protein (dsb) and had a water content of about 8–9 wt. %.

EXAMPLE 8

Batches (240 lbs) of soy white flakes were extracted and processed according to the procedure described in Example 7 except that following membrane filtration and pH adjustment, the retentate was not subjected to HTST treatment. Instead, following pH adjustment, the retenate was spray dried to yield a soy protein product which contained circa 90 wt. % protein (dry solids basis) and had a water content of 8–9 wt. %. The spray dried soy protein product had an average particle size of about 80 microns and a total bacterial count of no more than about 50,000 cfu/g.

EXAMPLE 9

Protein Content, NSI, Solubility, F.A.H. and Color Properties of Modified Oilseed Material Four soy protein isolate samples were manufactured using the procedures described in Examples 1–4 and were subjected to a number of tests to characterize the samples. The samples used for testing were composites of multiple production runs in a number of cases.

The four isolate samples were manufactured by extracting soy white flakes at either pH 8.5 (Ex. 1 and 2) or pH 9.5 (Ex. 3 and 4). The extracted protein was concentrated and diafiltered using a membrane system, pH adjusted to 6.8–7.0, then either passed through a HTST system (Ex. 1 and 3) or not (Ex. 2 and 4), and finally spray dried. The samples tested were composites of multiple production runs in a number of cases.

The four prototypes were assayed for protein content (dsb), nitrogen solubility index (NSI), by the method of AOCS Ba 11–65, protein solubility (true solubility) and fat content (by acid hydrolysis, as is—"F.A.H." by the method of AOAC 922.06) and the results are shown in Table 1. Results for some commercial soy protein isolate samples are also included for comparison. PTI Supro™ 515 is a commercial soy protein isolate recommended for use in processed meats. PTI Supro™ 760 is a commercial soy protein isolate recommended for beverage applications. A number of commercial samples have much higher fat contents. Whether this is a result of processing or post-recovery addition of fat is not clear.

Protein content was analyzed using either the Kjeldahl or Leco procedures, or near-infrared (NIR) spectroscopy. Cysteine was analyzed using standard methodology.

The level of free amino nitrogen (FAN) was determined using the ninhydrin method (see e.g., European Brewery Convention, 1987). Solid samples of oilseed material were extracted with water. In solution, each sample was diluted as needed to obtain 1–3 mg/L FAN. The diluted samples were reacted with a buffered ninhydrin solution in a boiling water bath for 16 min. After cooling in a 20° C. water bath for 10–20 min, the samples were diluted using potassium iodate in a water/ethanol solution. Within 30 min of this treatment, the absorbance at 570 nm was measured versus a control solution containing water but otherwise treated like the samples. The FAN level was calculated from a standard line using glycine at various concentrations as the reference.

Protein solubility was determined by weighing 50 mg samples of the soy products into microfuge tubes. The samples were dispersed in 1.0 mL deionized water at room temperature and allowed to stand for one hour. After centrifuging the samples in a benchtop microfuge for 5 minutes, 50 µL aliquots of supernatant were diluted with 950 µL of deionized water. The resulting solutions were diluted a second time by placing 5 µL of the diluted supernatant into a glass tube containing 1.0 mL deionized water. Bradford reagent (1.0 mL) was added to the tube and mixed immediately. The absorbance was read at 595 nm after 5 minutes. A standard curve based on bovine serum albumin was used to calculate the amount of protein in the original supernatants. The % solubility results reported in Table 6 were calculated based on an assumed protein concentration of 90% in the protein isolates.

TABLE 1

Protein Content, NSI, Solubility, Fat Content and Color.

| Sample | Protein* (%) | NSI | Solubility (%) | F.A.H. (%) | Color (L) |
|---|---|---|---|---|---|
| Example 1 | 90.6 | 85.1 | 54.8 | 1.17 | 89.1 |
| Example 2 | 89.9 | 85.8 | 43.9 | 1.49 | 88.1 |
| Example 3 | 88.6 | 33.4 | 13.0 | 1.35 | 86.4 |
| Example 4 | 89.9 | 95.3 | 58.2 | 1.67 | 86.9 |
| PTI Supro ™ 515 | 91.1 | 39.6 | 27.9 | — | 85.2 |
| PTI Supro ™ 760 | 90.1 | 31.6 | 24.0 | 2.08 | 86.5 |
| PTI Supro ™ 590 | — | — | 31.5 | 2.40 | — |
| PTI Supro ™ 661 | 91.2 | — | 24.8 | 2.07 | — |
| PTI Supro ™ 710 | — | — | 36.3 | 1.30 | — |

*Protein content determined by Leco Method.

One of the most obvious differences between the prototypes, the materials formed by the present method, and commercial samples is the color. The prototypes are much lighter and brighter in color than the commercial soy isolates. This is illustrated by comparison of the readings from a Gardner colorimeter on the samples (see Table 1). A higher value of "L" indicates a whiter product.

EXAMPLE 10
Gel Properties of Modified Oilseed Material

One measure of the ability of soy protein isolates to interact with water can be seen in gelling tests. In gelling, the protein denatures to form a loose network of protein surrounding and binding a large volume of water. A number of gelling measures can be used, but measurement of gel strength after setting and equilibrating at refrigerator temperature was chosen.

The soy gel determinations were conducted according to the following procedure:

1. Weigh 3.5 g soy protein isolate to a 50 mL tripour plastic beaker.
2. Measure out 30 mL phosphate buffer in a graduated cylinder (0.25% NaH$_2$PO$_4$ 0.7% NaCl adjusted to pH 5.7 with NaOH).
3. Add approximately 10 mL of buffer to soy. Mix with a spatula until the buffer is absorbed then add another 10 mL buffer. Continue mixing and adding until all of the buffer is mixed in and the mixture is homogenous. Insure that all of the soy remains with the tripour.
4. Mix on high for 30 seconds with the hand held homogenizer.
5. Cover with aluminum foil.
6. Cook in 90° C. water bath for 30 minutes minimizing time before samples are cooked to prevent settling. Cool in room temp bath for 30 minutes. Refrigerate overnight.
7. Measure gel strength (deformation) by determining resistance of the 13.5 wt. % soy isolate gel to a penetrating force using a Texture Technologies Ti2x Texture Analyzer. The ½ inch diameter acrylic cylinder was mounted on the instrument. The cylinder was centered over the tripour containing the gel. The penetration speed was set for 3 mm/sec. When a resistance of 4 g was reached, the probe was slowed to 2 mm/second and data acquisition was started. The probe was allowed to penetrate the gel for 15 mm then withdrawn at 5 mm/sec.

A traditional pattern of gel compression involves a rising resistance, followed by a break, followed by continuing resistance. The breaking strength is one measure of gel strength. Three of the prototypes follow this pattern (see FIG. 2), but one prototype (Example 2) shows no break point. Many commercial samples of soy protein isolate also do not form gels. Some readily separate after cooking, some form non-breaking pastes and other form weak gels.

The weakness of the gels formed from the samples prepared according to Examples 1–4 is another major observation. The three breaking prototypes showed break strengths around 20 g. For comparison, a series of gelatin gels made at differing concentrations were run. The gelatin gel showing comparable break strength (circa 20 g) was at 2% w/w (data not shown). Soy gels at 12–13% w/w can have break strengths of up to about 70 g, equivalent to gelatin gels between 2 and 5% w/w. In summary, the gel strength of soy isolates is typically low and the four prototypes described in Examples 4–7 are at the low end of the range expected for soy isolates.

EXAMPLE 11
Viscosity of Modified Oilseed Material Upon Heating

Native molecules (in their natural conformation) can impart some viscosity to a suspension simply by absorbing water. Upon heating, the molecules vibrate more vigorously and bind more water. At some point, the molecules lose their native conformation and become totally exposed to the water. This is called gelatinization in starch and denaturation in proteins. Further heating can decrease viscosity as all interactions between molecules are disrupted. Upon cooling, both types of polymers can form networks with high viscosity (called gels).

RVA analysis was developed for analysis of starchy samples and is generally similar to Brabender analysis. For example, a sample is suspended in water with stirring. The suspension is heated under some controlled regime and the viscosity (resistance to stirring) is constantly measured. The initial viscosity, peak viscosity, viscosity after cooling and changes in viscosity during transitions (slopes) can all be diagnostic.

The viscosity determinations were conducted according to the following procedure:

1. Determine sample moisture content (% as is).
2. Weigh 2 g±0.01 g of soy isolate into a weighing vessel.

3. Determine water weight for 12.5% or 15% dry solids according to manufacturer's instructions. Weigh the appropriate amount of distilled water directly into the RVA canister.
4. Immediately prior to the run, pour dry sample into the canister. Cap with a rubber stopper and vigorously shake the mixture up and down ten times.
5. Wipe off residue from stopper back into the canister. Insert a paddle into the canister, using it to scrape down any residue off the canister walls.
6. Load the sample into the RVA and run the appropriate temperature profile.

Two of the testing procedures involved the temperature and rpm profiles shown in Table 2.

TABLE 2

Temperature and rpm profiles for standard RVA method.

| Elapsed Time | Speed (rpm) | Temp ° C. |
|---|---|---|
| 0:00:00 | 960 | 50 |
| 0:00:10 | 160 | 50 |
| 0:04:42 | 160 | 95 |
| 0:07:12 | 160 | 95 |
| 0:11:00 | 160 | 50 |
| 0:13:00 | 160 | 50 |
| Method 2 | | |
| 0:00:00 | 960 | 30 |
| 0:01:00 | 320 | 30 |
| 0:04:00 | 320 | 80 |
| 0:07:00 | 320 | 80 |
| 0:08:00 | 320 | 85 |
| 0:11:00 | 320 | 85 |
| 0:12:00 | 320 | 90 |
| 0:15:00 | 320 | 90 |
| 0:16:00 | 320 | 95 |
| 0:19:00 | 320 | 95 |

In one experiment, performed according to the temperature and rpm profile shown as Method 1 in Table 2, a 15% slurry of isolate in water was heated to 95° C., held for 2.5 minutes then cooled to 50° C. The typical behavior observed for the material formed by the method of Example 2 is shown in FIG. 10. The typical behavior observed for a commercial sample of Supro™ 515 is shown in FIG. 11. Generally, the viscosity of the prototypes increased upon initial heating. The viscosity of the commercial samples, however, decreased upon initial heating. Further, the prototypes had very low initial viscosity, while the commercial samples either had no viscosity at any point or had a very high initial viscosity and thinned upon heating. Within the prototypes, the samples which had not been subjected to HTST treatment showed viscosity development during heating. Samples that had been HTST treated had relatively little viscosity buildup. Each of the prototypes tested formed gels upon cooling.

The potential importance of RVA analysis relates to water loss and fat retention from systems during cooking. Increased viscosity can retard the migration of liquids. The viscosity arises from the interaction between the protein and the water in the system. As more water becomes bound by the protein, the viscosity of the system increases. This is one of the most important forms of water holding and can be very persistent and stress resistant. The prototype increases viscosity with heating so its hold on water is improving during the early stage of cooking. In contrast, most commercial samples decreased in viscosity early in cooking and decreased their hold on the water. "Free" water would tend to be more available to evaporate or drain from the product. Additionally, other potentially fluid components of the system (like fat) would be less likely to drain from a system due to the increased resistance provided by a higher viscosity.

The data from another experiment, performed according to the temperature and rpm profile shown as Method 2 in Table 2, allows one to measure the change in viscosity (in centipoise, "cP"). As used herein, the viscosity slope is calculated by determining the difference between an initial viscosity at 43° C. and a final viscosity at 95° C. and dividing the difference by the time. The viscosity slope is computed from the initial viscosity (at 43° C.) and the final viscosity (95° C.) without regard to viscosities at any point in between. Results of this analysis are shown in Table 3 for 12.5% slurries of modified oilseed material. As the results indicate, only one of the commercial samples have a positive viscosity slope (in cP/min).

TABLE 3

Viscosity Slope and Initial Viscosity.

| Material | Viscosity Slope (cP/min) | Viscosity at 1 Min (cP) |
|---|---|---|
| Example 1 | 3.87 | 478 |
| Example 2 | 53.97 | 296 |
| Example 3 | −25.70 | 1502 |
| Example 4 | 74.33 | 442 |
| Example 5 | 7.83 | 120 |
| Example 6 | 77.27 | 56 |
| Example 7 | 12.13 | 151 |
| Example 8 | 77.23 | 127 |
| Supro ™ 610 | 0.20 | — |
| Supro ™ 515 | −7.30 | 579 |
| Profam ™ 891 | −13.23 | 391 |
| Supro ™ 760 | −23.43 | 633 |
| Profam ™ 982 | −25.43 | 541 |

Another measure that can be made is of the "initial viscosity" (the viscosity after 1 min. of mixing at about 30° C.). This comparison is also reported in Table 3. The material formed by the method described in Example 3 had an exceptionally high initial viscosity (about 1500 cP), but generally the examples had lower initial viscosities than the commercial samples. The combination of low initial viscosity and an increase in viscosity upon heating may be an advantage in applications like processed meat products where thinner solutions can more easily be injected or massaged into meat products but can be less likely to loose water during cooking.

EXAMPLE 12

Emulsion Stability of Modified Soy Material

One of the potential functional properties of proteins is stabilization of interfaces, for example the oil-water interface. Oil and water are not miscible and in the absence of a material to stabilize the interface between them, the total surface area of the interface will be minimized. This typically leads to separate oil and water phases. It is widely believed that proteins can stabilize these interfaces.

An analysis was performed according to the following procedure. Samples of 10 mg were suspended in 13 mL of 50 mM sodium phosphate at pH 7.0. After 15–20 minutes of hydration, 7 mL of corn oil was added. The mixture was homogenized for 1 minute at high speed with a handheld polytron-type homogenizer. A pipette was used to transfer 12 mL of the emulsion phase (avoiding the aqueous phase) to a graduated centrifuge tube. The tubes were centrifuged in a clinical centrifuge at full speed for 30 minutes. The volume of oil released during centrifugation was recorded. Oil volume was read from the bottom of the meniscus to the top of the aqueous layer (which was typically flat). In the absence of centrifugation, no oil separates from the emulsions within 2–3 hours. No measurement of the aqueous layer or emulsion layer was made.

The results shown in Table 4 suggest that the prototypes are capable of stabilizing emulsions much better than the commercial products tested. As used herein, the term "Emulsion Oil Release," or "EOR" refers to the amount of oil (in mL) released from the emulsion according to the assay described above.

TABLE 4

Emulsion oil released after centrifugation.

| Sample | Producer | EOR (mL) |
| --- | --- | --- |
| Example 6 | Cargill | 0.20 |
| Example 5 | Cargill | 0.25 |
| Example 7 | Cargill | 0.25 |
| Example 8 | Cargill | 0.25 |
| Example 1 | Cargill | 0.35 |
| Example 4 | Cargill | 0.40 |
| Supro XT10 | PTI | 0.45 |
| Profam 891 | ADM | 0.45 |
| Example 2 | Cargill | 0.50 |
| Example 3 | Cargill | 0.55 |
| FX950 | PTI | 0.60 |
| Supro ™ 670 | PTI | 0.65 |
| Supro ™ 710 | PTI | 0.65 |
| FP 940 | PTI | 1.15 |
| Supro ™ 425 | PTI | 1.45 |
| Profam ™ 981 | ADM | 1.65 |
| Profam ™ 974 | ADM | 1.93 |
| Supro ™ 661 | PTI | 2.75 |
| Supro ™ 515 | PTI | 2.77 |
| Supro ™ 590 | PTI | 2.90 |
| Supro ™ 760 | PTI | 3.10 |
| Supro ™ 500E | PTI | 3.40 |
| Profam ™ 648 | ADM | 3.45 |

The hypothesis that high molecular weight proteins would be more functional under stress was tested by calculating the correlation coefficients between the emulsion oil released and the molecular weight values reported in Table 11. As the results show, oil release was negatively correlated with the portion of protein greater than 300 kDA and the weighted average molecular weight $MW_{50}$. In other words, large proteins tended to hold the oil better.

TABLE 5

Correlation coefficients between molecular weight measures and EOR.

|  |  | EOR |
| --- | --- | --- |
| Greater than 300 kDa | Pearson Correlation | −.655 |
|  | Sig. (2-tailed) | .001 |
| Less than 100 kDa | Pearson Correlation | .554 |
|  | Sig. (2-tailed) | .007 |
| $MW_{50}$ | Pearson Correlation | −.493 |
|  | Sig. (2-tailed) | .020 |

EXAMPLE 13
Flavor Attributes of Modified Oilseed Material

Beverage products generally place some different demands on the physical properties of protein isolates. Flavor is a much more important attribute because the protein isolate can be a much larger portion of the finished product. This is especially the case with beverages intended to meet the health claim criteria. Some fortified adult beverages contain small amounts of isolate with the bulk of the protein derived from milk products. In order to successfully compete with such products, beverages based on vegetable protein isolates must have comparable flavor qualities.

A flavor panel conducted tests on 5% dispersions of the protein isolates in water. The materials from Examples 1–4 were compared to PTI Supro™ 760, an isolate commonly used in beverages. Preparation of the test solutions allowed a number of observations to be made. The prototypes did not disperse well, compared to the Supro™ 760 and had to be mixed in with a Waring blender. Consequently, about 4-times as much foaming was observed with the prototypes. The resulting solutions also had a different "color" than the commercial product, essentially appearing to be darker. The Example 4 product was the darkest.

Some of the flavor attributes identified by the flavor panel are shown in Table 6. With the exception of the Example 3 product, the prototypes were associated more with grainy flavors than the commercial product. This could be a significant advantage in formulating beverages.

The same five isolates were then formulated into an adult beverage similar to one sold ready-to-eat in cans. The product formula only included soy protein product at 0.7% of the formula (as is). The total formula is about 30% solids, 12% protein (dry basis) and about 18% of the protein present is from the soy isolate. The overall contribution of soy protein to the formula is about 0.6%. Not surprisingly, there were no observable differences in flavor between the finished products.

TABLE 6

Flavor Attributes

| Sample | Total Intensity of Flavor | Flavor Notes |
| --- | --- | --- |
| Supro ™ 760 | 1 | Cardboard, starchy, starchy mouthfeel, sour |
| Example 1 | 1.5 | Sweet grain, oat-like, sour, wallpaper paste |
| Example 2 | 1–1.5 | Boiled rice, sweet, starchy, starchy mouthfeel |
| Example 3 | 1–1.5 | Wet wool, starchy, starchy mouthfeel, slightly earthy |
| Example 4 | 0.5 | Grainy, grassy-green, dimethylsulfide (like cream corn), rice water |

EXAMPLE 14
Solubility Attributes of Modified Oilseed Material

Slurries (5% (w/w)) were made up in the presence of 5% (w/w) sucrose in deionized water. The four prototypes were somewhat difficult to wet and had to be mixed with a homogenizer to get uniform slurries. This was not required for the two commercial products. The resulting slurries were allowed to stand for about 1 hour at room temperature, then aliquots were diluted 10-fold into water and the absorbance at 500 nm was measured. This absorbance measurement is influenced by turbidity and/or solubility; higher absorbance values indicated lower solubility. The results are shown in Table 7. The observations suggest that three of the prototypes were more prone to go into solution than to simply be suspended in the slurry. This could be an advantage in formulating beverage products where opacity is not desired. Photos were also taken of the slurries immediately after settling for 16 hours and after subsequent remixing. The three prototypes that showed the lowest absorbance in Table 7 also showed the least settling overnight. While it may not be apparent from the photos, the slurry derived from the Example 3 prototype had a distinctly brownish tint. It was clear from further observation that a lack of particulates tended to make the suspensions look darker. Upon settling, the upper portion of the slurries made with the commercial samples darkened. Shaking the slurries made them appear lighter again.

TABLE 7

Absorbance of Protein Isolate Slurries in Sucrose Solutions.

| Sample | Absorbance (500 nm) |
| --- | --- |
| Example 2 | 0.894 |
| Example 1 | 0.856 |
| Example 4 | 0.581 |
| Example 3 | 1.294 |
| Supro ™ 760 | 1.078 |
| Supro ™ 670 | 1.531 |

Samples of the prototypes were also formulated into an adult beverage. A high-soy protein beverage that would meet the new health claim requirements was targeted. The initial formulas were quite simple (see Table 8). Beverages formulated from the prototypes were compared to ones based on Supro™ 670 (from Protein Technology Inc.) and Profam™ 974 (from Archer Daniels Midland). These were the products recommended by the respective manufacturers for formulation of beverages of this type.

TABLE 8

Formulas for Flavored high-soy beverage mixes.

| Ingredient | Vanilla-flavored | Chocolate-flavored |
| --- | --- | --- |
| Soy isolate | 38.20 | 32.21 |
| Sugar | 57.29 | 48.32 |
| Cocoa | — | 15.66 |
| Vanilla powder | 2.65 | 2.24 |
| Salt | 1.86 | 1.57 |
| TOTAL | 100.00 | 100.00 |

Sensory evaluation was performed on the prototype beverages and on comparable beverages made with the commercial products. Dry mix of chocolate (44.7 g) or vanilla (37.7) were added to 472 g water, mixed in a Waring blender for about 10 seconds to completely mix and evaluated on a scale from one (poor) to five (good). These levels of addition resulted in identical soy protein contents in the finished beverage (6.48 g per 8-ounce serving). Overall ratings of soy-based beverages containing prototype and commercial isolates are shown in Table 9. The ratings are the average of scores from 7 panelists. It was noted that the flavored beverages based on the prototypes of Examples 1–4 lacked any gritty mouthfeel and that settled less upon standing than the commercial products.

TABLE 9

Flavor Ratings of soy-based beverages.

| Material | Vanilla-flavored | Chocolate-flavored |
| --- | --- | --- |
| Example 1 | 3.01 | 3.43 |
| Example 2 | 2.09 | 3.08 |
| Example 3 | 2.54 | 2.26 |
| Example 4 | 3.03 | 3.54 |
| Profam ™ 974 | 2.19 | 2.64 |
| Supro ™ 670 | 2.03 | 2.41 |

EXAMPLE 15

Protein, Fat, Fiber, Moisture, Ash and Fiber Content of Modified Oilseed Material Additional analyses of the compositions of the four prototypes described in Examples 1–4 were analyzed for protein, fat, fiber, moisture, and ash content. The results are shown in Table 10. The analyses were conducted using standard AOAC methods. Crude fiber followed method AOAC 962.09. Fat (by acid hydrolysis) followed method AOAC 922.06. Moisture and ash followed method AOAC 930.42/942.05. Protein (Kjeldahl using a 6.25 conversion factor) was conducted using method AOAC991.20.1.

One of the consequences of protein degradation by enzymes (or acid) is the release of alpha-amines. These amines react with ninhydrin and allow a way to measure the degree of hydrolysis. This method was applied to the commercial and prototype isolates with the results shown in Table 10. Though large differences between commercial isolates are evident, there is no systematic difference between the samples of Examples 1–4 and the commercial samples. Examples of soy protein products with high, medium or low concentrations of FAN were found.

TABLE 10

| | Example 1 | Example 2 | Example 3 | Example 4 |
| --- | --- | --- | --- | --- |
| Protein* | 83.06 | 81.40 | 79.69 | 81.17 |
| FAN (mg/g) | 0.57 | 1.09 | 0.40 | 2.06 |
| Fat** | 2.14 | 1.48 | 1.24 | 1.17 |
| Moisture | 5.86 | 8.45 | 8.09 | 8.45 |
| Ash | 5.65 | 5.97 | 6.51 | 6.18 |
| Fiber | 0.15 | 0.12 | 0.27 | 0.17 |

*Protein content determined by Kjeldahl Method.
**Fat content determined by acid hydrolysis

EXAMPLE 16

Molecular Weight Profiles of Modified Oilseed Material

One indicator of the amount of proteins still present in their native structure is their molecular weight profile. For pure proteins, chromatography usually reveals a single symmetric peak. Mixtures of proteins, as would exist in soy isolate, should generally consist of a series of symmetric peaks. If processing did not result in breaking up of the protein, a similar profile would be expected to be observed for soy isolates.

Samples of soy protein products (25 mg) were suspended in 1 mL of 50 mM sodium phosphate-NaOH (pH 6.8). The samples were mixed vigorously (and occasionally sonicated) for a total of 20 minutes. The samples were centrifuged for 1 minute in a microfuge to settle the insolubles. Supernatant (100 μL) was dilated with solvent (900 μL), filtered through a 0.45 μm syringe filter and 100 μL of the filtered sample was injected onto the HPLC. The HPLC columns were a tandem set comprising Biorad SEC 125 and SEC 250 gel chromatography columns equilibrated with 50 mM sodium phosphate-NaOH (pH 6.8), 0.01% w/v sodium azide. Flow rate was set at 0.5 mL/min and the elution of proteins was monitored at 280 nm. In addition to the samples of the soy protein products, a sample of fresh, clarified extract (pH 8.5) of soy flakes was diluted in equilibration buffer and run to provide an untreated comparison. In brief, the vast majority of commercial samples (not shown) show signs of degradation, sometimes significant amounts of degradation. The prototype samples of Examples 1–8, however, showed substantially less evidence of degradation.

Degradation could be accidental or deliberate. Accidental degradation could arise from mechanical damage (e.g., high shear or cavitation mixing), acid or alkali hydrolysis during heating steps, or enzymatic hydrolysis at any time during processing. The enzymatic hydrolysis could be due to either protein degrading enzymes naturally present in the soy or enzymes secreted by contaminating bacteria. The proteins could also be intentionally degraded in order to improve the functional properties of the protein. Partial hydrolysis can improve emulsification or foaming properties of soy proteins. Extensive hydrolysis can improve solubility under acidic conditions.

Samples of commercial soy isolates were obtained from various commercial sources. The collection of the raw molecular weight profile data is described above. An analysis of this raw chromatographic data that uses the correlation between elution time and molecular weight was used. The HPLC gel filtration column was calibrated with a set of proteins of "known" molecular weight. A calibration curve was generated and the equation for that calibration determined. The chromatographs for the samples were then sliced into 30–50 sections and the areas for those slices calculated. This was converted into "area percent" by dividing the slice's area by the total area for the chromatogram (limited to the molecular weight range between about 1000 daltons and the breakthrough molecular weight). The elution times for each slice were plugged into the calibration formula and the corresponding molecular weights were calculated. A plot was then generated comparing the cumulative percentage of protein detected and the molecular weight.

The analysis is analogous to that used for particle size analysis in emulsions. For example, one can ask what percentage of the material is less than 100 kDa. For Supro™ 425, the less than 100 kDa fraction comprises about 62%, while for the material formed by the method described in Example 6, this fraction comprises about 30%. Another way to analyze the chromatographic data is to calculate the molecular weight at which 50% of the mass is above and 50% of the mass is below. This is not precisely the mean molecular weight, but is closer to a weighted average molecular weight. This is referred to herein by the term "$MW_{50}$." The $MW_{50}$ for Supro™ 425 is about 50 kDa, while the $MW_{50}$ for the material formed by the method of Example 6 material is about 480 kDa.

TABLE 11

Molecular Weight Metrics.

| Product | Wt. % >300 | Wt. % <100 | $MW_{50}$ (kDa) |
|---|---|---|---|
| Example 8 | 73 | 14 | 600 |
| Example 5 | 72 | 39 | 520 |
| Example 7 | 67 | 23 | 680 |
| Example 6 | 64 | 28 | 480 |
| Example 4 | 47 | 33 | 290 |
| Example 2 | 44 | 50 | 100 |
| Extract | 30 | 60 | 40 |
| Example 1 | 30 | 60 | 40 |
| Example 3 | 27 | 59 | 80 |
| FX940 | 22.5 | 59 | 55 |
| Profam ™ 891 | 20 | 50 | 100 |
| Profam ™ 974 | 20 | 66 | 39 |
| Supro ™ 670 | 20 | 62 | 55 |
| Supro ™ 515 | 18 | 65 | 60 |
| Supro ™ 500E | 16 | 60 | 68 |
| FXP ™ 950 | 15 | 70 | 6 |
| Supro ™ 610 | 15 | 60 | 85 |
| Supro ™ 590 | 14 | 54 | 85 |
| Supro ™ 425 | 10 | 65 | 50 |
| Supro ™ 710 | 9 | 76 | 29 |
| Supro ™ 760 | 7 | 67 | 55 |
| Supro ™ 661 | 6 | 64 | 70 |
| Profam ™ 981 | 5 | 81 | 28 |

TABLE 11-continued

Molecular Weight Metrics.

| Product | Wt. % >300 | Wt. % <100 | $MW_{50}$ (kDa) |
|---|---|---|---|
| Profam ™ 648 | 4 | 84 | 11 |
| Profam ™ 982 | 2.5 | 87 | 25 |

The present prototypes (the materials formed by the methods described in Examples 1–8) have a significantly higher percentage of high molecular weight proteins than the commercial samples. Most commercial samples examined had significantly less high molecular weight material than the raw extract.

The possible impacts of higher molecular weight fractions could come in a number of areas. One benefit is the reduced presence of bitter peptides. Hydrolysis of proteins to low molecular weight peptides (400<MW<2000) often results in production of compounds with bitter flavor. One example of this is aspartame, which is associated exceptional sweetness but also with a bitter aftertaste. The flavor of soy protein is derived from a complex mixture of components. Bitterness is one of these off-flavors. The reduced peptide content could contribute to a less bitter tasting product.

A second consequence of high molecular weight could be in interface stabilization. Though air-water and oil-water interfaces may be better stabilized initially by lower molecular weight materials, stabilization of these surfaces may depend on larger molecules. It is worth noting that some of the best emulsion stabilization results were observed are with the materials made by the methods described in Examples 5–8.

EXAMPLE 17

DSC Scans of Modified Oilseed Material

Samples of soy protein products (50 mg) were weighed into a sample vial, mixed with 50 µL water and crimped shut. Samples were placed in a Perkin-Ehner DSC and heated at 10° C./min from about 30° C. to about 135° C.

In brief, native soy protein (as represented by a spray dried sample of a crude extract obtained from untoasted, defatted soy flakes) has a maximum energy absorption at about 93° C. with a side peak of absorption around 82° C. The 93° C. peak apparently represents the 11S protein and the 82° C. peak the 7S protein (see, e.g., Sorgentini et al., *J. Ag. Food Chem.,* 43:2471–2479 (1995)). The data obtained from DSC scans of the protein products of Examples 1–4 as well as for Supro™ 670 are summarized in Table 12. The soy protein products from Examples 2 and 4 showed large peak energy absorption at about 93° C. The soy protein products from Examples 1 and 3 showed smaller peak energy absorption at about 82° C. Commercial samples tended to show peaks only around 82° C. and a number of commercial samples show no signs of heat absorption at all, indicating that the protein in the sample was already completely denatured. No commercial samples showed a peak at 93° C.

TABLE 12

DSC Analysis of Soy Protein Isolates

|  | Ex. 1 | Ex. 2 | Ex. 3 | Ex. 4 | Supro ™ 670 |
|---|---|---|---|---|---|
| Peak Energy Absorption | 82.68° C. | 94.28° C. | 82.5° C. | 92.21°C. | 82.53°C. |
| Energy of Absorption (J/g) | 0.98 | 9.24 | 1.39 | 8.30 | 1.37 |

EXAMPLE 18
Amino Acid Content of Modified Oilseed Material

The amino acid composition of a modified oilseed material may not only be important from a nutritional perspective, but is an important part of determining the functional behavior of the protein. The amino acid content of a modified oilseed material may be determined by a variety of known methods depending on the particular amino acid in question. For example, cysteine may be analyzed after hydrolysis with perfomic acid according to known methods. To compare materials with different protein contents, compositions may be recalculated to a 100% protein basis. Typically, the amino acid composition materials derived from a common starting material would be expected to be very similar. Table 13 shows the amount of cysteine as a weight percent of the total amount of protein in a number of soy protein isolates. As shown in Table 13, direct comparison of the average compositions shows that cysteine (assayed as cystine) in the materials formed by the present method include about 17% more cysteine that the commercial sample average.

TABLE 13

Cysteine Content

| Product | Cys |
|---|---|
| Example 5 | 1.56% |
| Example 6 | 1.46% |
| Example 7 | 1.46% |
| Example 8 | 1.42% |
| Supro ™ 760 | 1.26% |
| Supro ™ 515 | 1.24% |
| Profam ™ 982 | 1.28% |
| Profam ™ 891 | 1.28% |
| Prototype Average | 1.48% |
| Commercial Average | 1.27% |
| Ratio - Prototype/Commercial | 1.16 |

EXAMPLE 19
Conductivity/Salt Content of Modified Oilseed Material

Suspension (5% (w/v)-dsb) of samples of soy protein products were prepared in distilled deionized water. Each suspension was vigorously mixed without pH adjustment and left standing for 20–60 min at RT. The suspension was re-mixed and the conductivity measured. The pH was adjusted to 7.0 and the conductivity measured again.

Analyses for sodium, calcium and potassium content of samples were carried out using a modification of the EPA 6010B method. In brief, samples were refluxed in nitric acid, cooled, filtered and diluted by inductively coupled plasma spectroscopy-atomic emission spectroscopy. Two samples were analyzed in duplicate, spikes with standard samples were used to confirm complete recovery of ions and two samples with exceptionally high sodium contents were reconfirmed by additional analysis. All checks indicated that the results were reliable.

The modified oilseed materials formed by the present method generally have a relatively low amount of sodium ions. This is reflected in a low ratio of sodium ions as a percentage (on a weight basis) of the total of sodium, calcium and potassium ions. Typically, the ratio of sodium ions to the total of sodium, calcium and potassium ions is no more than about 0.5:1.0 (i.e., 50%) and, more desirably, no more than about 03:1.0 (i.e., 30%). In some instances, it may be possible to produce modified soy protein materials where the ratio of sodium ions to the total of sodium, calcium and potassium ions is no more than about 0.2:1.0 (i.e., 20%). The method allows the production of modified soy protein materials with levels of sodium ions of no more than about 7000 mg/kg (dsb). By employing deionized water in the extraction and/or diafiltration steps, it may possible to produce modified soy protein materials with even lower levels of sodium ions, e.g., sodium ion levels of 5000 mg/kg (dsb) or below.

Soybeans contain relatively little sodium, but substantial quantities of potassium and calcium. A number of bases may be used in the processing of soy isolates that could end up as part of the finished product. While sodium hydroxide would be the most common choice, calcium and potassium hydroxides could also be employed. For example, calcium hydroxide might be used to attempt to produce a soy isolate more similar to milk protein. Because the process described in Examples 1–4 to manufacture the soy protein products has few pH changes and the final pH change is downward, there was a reasonable chance that lower levels of sodium would be found, compared to products produced by commercial processes. This is confirmed by the results of the analysis, shown in Table 14.

The material produced in Examples 1–4 have significantly lower sodium content and significantly higher potassium content than the samples of commercial soy isolates. With two exceptions, the calcium content of the samples from Examples 1–4 was much higher than the commercial samples. Most surprising is the extremely low potassium and calcium contents of several products (exemplified by Profam™ 974).

TABLE 14

|  | Ex. 1 | Ex. 2 | Ex. 3 | Ex. 4 | Supro ™ 760 | Profam ™ 974 |
|---|---|---|---|---|---|---|
| Conductivity (Micromhos) | | | | | | |
| As is pH | 1350 | 1850 | 2200 | 1850 | 1000 | 1200 |
| pH 7 | 1810 | 1850 | 4050 | 2020 | 2850 | 1600 |

TABLE 14-continued

|  | Ex. 1 | Ex. 2 | Ex. 3 | Ex. 4 | Supro™ 760 | Profam™ 974 |
|---|---|---|---|---|---|---|
| Cation Content (mg/kg) | | | | | | |
| Na | 4200 | 6700 | 5600 | 5700 | 12000 | 13000 |
| Ca | 4800 | 5000 | 5400 | 4500 | 3900 | 390 |
| K | 14000 | 12000 | 14000 | 14000 | 1600 | 930 |
| Na/(Na + Ca + K) | 18.3 | 28.3 | 22.4 | 23.6 | 68.6 | 90.8 |

EXAMPLE 20

Chocolate Orange Energy Bar

A nutritional bar, composed of 2 phases: A) protein-base binder combined with a cereal mixture containing fruit chips; and B) chocolate coating is prepared as follows:

A. The protein base was composed of the following ingredients:

| Ingredients | Formula (wt. %) |
|---|---|
| Corn syrup (63/43) | 64.70 |
| Clover honey | 0.50 |
| Liquid Sorbitol | 7.50 |
| Soybean oil | 4.00 |
| Glycerin | 1.50 |
| Orange flavor | 0.10 |
| Vanilla flavor | 0.50 |
| Soy protein isolate (Example 5) | 13.00 |
| Cocoa | 8.00 |
| Fine Flake Salt | 0.20 |

The first seven ingredients, i.e., corn syrup, honey, sorbitol, oil, glycerin and the 2 flavors, were combined in a Hobart mixer until well mixed. The soy protein isolate, cocoa and salt were pre-blended and then added slowly to the liquid mixture and mixed until an homogeneous paste was obtained. The finished bar filling was combined in a Hobart mixer utilizing the following ingredients:

| Ingredients | Formula (wt. %) |
|---|---|
| Protein-base binder | 60 |
| Textured soy flour | 28 |
| Large crisp rice | 7 |
| Orange fruit chips | 5 |

The bars were spread on a sheet into ¾" thick bars and then cut into 71 g bars. Each bar was enrobed with 18 grams of a chocolate coating. The products were wrapped, sealed hermetically and stored at room temperature.

EXAMPLE 21

Chocolate Coating

A high soy protein inclusion (16.0% soy protein/17% total protein) coating, which tastes very bland (no off-flavors from soy detected) and has very good functional properties, to be used in protein enriched confectionery applications was prepared from the ingredients listed below. The soy protein isolate was produced according to the method of Example 5.

| Ingredients | Formula (wt. %) |
|---|---|
| Sugar | 36.6 |
| Fractionated Palm Kernel Oil | 29.1 |
| Soy protein isolate (Example 5) | 17.3 |
| Amber (11% fat) | 10.8 |
| Cote Hi (100% fat) | 1.1 |
| Lecithin | 0.5 |
| Mack Flavor nat. 01301 | 0.8 |
| Salt | 0.1 |
| Whole Milk Powder (28.5% fat) | 3.6 |

All of the dry ingredients were mixed together in a 12 quart Hobart mixer. The palm kernel oil was added to give a mixing fat of approximately 29%. The resulting mass was sent through a 3 roll refiner to provide a flake material with a maximum particle size of 30 microns. The resultant flake was returned to a clean 12 quart Hobart mixing bowl and allowed to mix under heated conditions (water jacketed bowl at 130° F./54.5° C.) for approximately 2 hours. The remaining fat was then added to the system. After all the fat was incorporated, small amounts of soy lecithin were added to fluidize the mass and obtain the desired plastic viscosity. After typical physical testing had been performed (particle size, plastic viscosity, colorimeter, fat by NMR), the coating was poured into 10 lb plastic molds, placed into a cooling tunnel which has an ambient temperature of 50° F., and allowed to harden for one hour.

EXAMPLE 22

Chocolate Orange Energy Bar with Protein Enriched Chocolate Coating

A nutritional bar, composed of 2 phases: A) protein-base binder combined with a cereal mixture containing fruit chips B) chocolate coating, that contains 15 g soy protein per serving (80 g), utilizing soy isolate and textured soy flour, was prepared according to the following procedure:

The protein base was composed of the following ingredients:

| Ingredients | Formula (wt. %) |
|---|---|
| Corn syrup (63/43) | 64.70 |
| Clover honey | 0.50 |
| Liquid Sorbitol | 7.50 |
| Soybean oil | 4.00 |
| Glycerin | 1.50 |
| Orange flavor | 0.10 |
| Vanilla flavor | 0.50 |
| Soy protein isolate (Example 5) | 13.00 |
| Cocoa | 8.00 |
| Fine Flake Salt | 0.20 |

The first seven ingredients, i.e., corn syrup, honey, sorbitol, oil, glycerin and the 2 flavors, were combined in a Hobart mixer until well mixed. The soy protein isolate, cocoa and salt were pre-blended and then added slowly to the liquid mixture and mixed until an homogeneous paste was obtained. The finished bar filling was combined in a Hobart mixer utilizing the following ingredients:

| Ingredients | Formula (wt. %) |
| --- | --- |
| Protein-based binder (above) | 60 |
| Textured soy flour | 28 |
| Large crisp rice | 0.7 |
| Orange fruit chips | 0.5 |

The bars were formed by spreading the mixture onto a sheet in a ¾" thick layer and cut into 64 g bars. Each bar was enrobed with 16 grams of a chocolate coating (prepared according to the procedure of Example 21) containing 16% soy protein. The products were wrapped, sealed hermetically and kept at room temperature.

EXAMPLE 23

Yogurt Coating

A high soy protein inclusion (18.4% soy protein/25% total protein) coating, which tastes very bland (no off-flavors from soy detected) and has very good functional properties, to be used in protein enriched confectionery applications is prepared as follows:

| Ingredients | Formula (wt. %) |
| --- | --- |
| Hydrogenated Palm Kernel Oil | 30.6 |
| Sugar | 29.5 |
| Soy protein isolate (Example 5) | 19.7 |
| Yogurt powder | 14.8 |
| Non fat dry milk | 4.9 |
| Lecithin | 0.4 |
| Vanillin | 0.05 |

All of the dry ingredients were mixed together in a 12 quart Hobart mixer. The palm kernel oil was added to give a mixing fat of approximately 29%. The resulting mass was sent through a 3 roll refiner to provide a flake material with a maximum particle size of 30 microns. The resultant flake was returned to a clean 12 quart Hobart mixing bowl and allowed to mix under heated conditions (water jacketed bowl at 130 F./54.5) for approximately 2 hours. The remaining fat was then added to the system. After all the fat was incorporated, small amounts of soy lecithin were added to fluidize the mass and obtain the desired plastic viscosity. After typical physical testing had been performed (particle size, plastic viscosity, colorimeter, fat by NMR), the coating was poured into 10 lb plastic moulds, placed into a cooling tunnel which has an ambient temperature of 50° F., and allowed to harden for one hour.

EXAMPLE 24

Protein Supplemented Cereal Coating

This product was developed for the cereal industry as a sweetened coating which can be used to add soy protein content to a cereal product.

| Ingredients | Formula (wt. %) |
| --- | --- |
| Water (140 degrees F.) | 60.00 |
| Soy Protein Isolate (Example 5) | 8.00 |
| Sugar | 31.05 |
| Vanilla Flavor | 0.35 |
| Salt | 0.60 |

The water and soy protein isolate (produced according to the method of Example 5) were combined with handheld homogenizer until dispersed. The remaining ingredients were added and mixed until blended. The resulting syrup can be combined with the desired cereal mix at a 41:59 ratio of coating syrup: cereal. The coated cereal mix is then typically baked in a convection oven at 200° F., stirring every 10 minutes to facilitate drying. The target moisture range for this type of coated cereal product is generally about 4–6 wt. %.

Additional Illustrative Embodiments

A number of illustrative embodiments of the present protein supplemented confectionery composition are described below. The embodiments described are intended to provide illustrative examples of the confectionery composition and are not intended to limit the scope of the invention.

The protein supplemented confectionery composition typically includes a sweetener and a modified oilseed material, which includes at least about 85 wt. % and, more desirably, at least about 90 wt. % protein on a dry solids basis. The confectionery composition often also includes a triacylglycerol component.

The confectionery composition can include a modified oilseed material which is produced by a process which includes: (a) extracting oilseed material with an aqueous alkaline solution to form a suspension of particulate matter in an oilseed extract; and (b) passing the extract through a filtration system including a microporous membrane to produce a permeate and a protein-enriched retentate. The microporous membrane commonly has a filtering surface with a contact angle of no more than 30 degrees.

The confectionery composition can include a modified oilseed material which has an $MW_{50}$ of at least about 200 kDa and at least about 40 wt. % of the protein in a 50 mg sample of the modified oilseed material is soluble in 1.0 mL water at 25° C.

The confectionery composition can include a modified oilseed material which has a bacterial load of no more than 50,000 cfu/g and a melting temperature of at least 87° C.

The confectionery composition can include a modified oilseed material which has an $MW_{50}$ of at least about 200 kDa and a turbidity factor of no more than about 0.95 at 500 nm.

The confectionery composition can include a modified oilseed material which has an $MW_{50}$ of at least about 200 kDa and has an NSI of at least about 80.

The confectionery composition can include a modified oilseed material which has an EOR of no more than about 0.75 mL and, more desirably, no more than about 0.5 mL. At least about 40 wt. % and, more desirably, 60 wt. % of the modified oilseed material commonly has an apparent molecular weight of at least 300 kDa.

The confectionery composition can include a modified oilseed material which has a melting temperature of at least 87° C. At least about 40 wt. % and, more desirably, 60 wt. % of the modified oilseed material commonly has an apparent molecular weight of greater than 300 kDa.

The confectionery composition can include a modified oilseed material which has an $MW_{50}$ of at least 200 kDa, and a melting temperature of at least 87° C.

The confectionery composition can include a modified oilseed material which has a viscosity slope of at least about 30 cP/min. At least about 40 wt. % and, more desirably, 60 wt. % of the modified oilseed material commonly has an apparent molecular weight of greater than 300 kDa.

The confectionery composition can include a modified oilseed material which has an $MW_{50}$ of at least 200 kDa, and a viscosity slope of at least about 30 cP/min.

The confectionery composition can include a modified soybean material, sugar and, optionally, a triacylglycerol component. The modified soybean material typically includes at least 90 wt. % protein on a dry solids basis and at least about 40 wt. % and, more desirably, 60 wt. % of the modified soybean material has an apparent molecular weight of greater than 300 kDa; and the modified soybean material has a viscosity slope of at least about 30 cP/min and a melting temperature of at least 87° C.

The confectionery composition can include a modified oilseed material which has a turbidity factor of no more than about 0.95 at 500 nm. At least about 40 wt. % and, more desirably, 60 wt. % of the modified oilseed material commonly has an apparent molecular weight of greater than 300 kDa.

The confectionery composition can include a modified oilseed material which has a bacterial load of no more than 50,000 cfu/g and a melting temperature of at least 87° C.

The confectionery composition can include a modified oilseed material in which at least about 40 wt. % of the modified oilseed material has an apparent molecular weight of greater than 300 kDa; and at least about 40 wt. % of the protein in a 50 mg sample of the modified oilseed material is soluble in 1.0 mL water at 25° C.

The confectionery composition can include a modified oilseed material which has an $MW_{50}$ of at least about 400 kDa where at least about 40 wt. % of the protein in a 50 mg sample of the modified soybean material is soluble in 1.0 mL water at 25° C.

The confectionery composition can include a modified soybean material, sugar and a triacylglycerol component. The modified soybean material desirably includes at least 90 wt. % protein on a dry solids basis. The modified soybean material can have an $MW_{50}$ of at least 200 kDa and an EOR of no more than about 0.75 mL.

The confectionery composition can include a modified soybean material, water and optionally, a triacylglycerol component. The modified soybean material desirably includes at least about 90 wt. % protein on a dry solids basis. The modified oilseed material has an $MW_{50}$ of at least about 400 kDa and at least about 40 wt. %. Typically, at least 40 wt. % of the protein in a 50 mg sample of the modified soybean material is soluble in 1.0 mL water at 25° C.

The invention has been described with reference to various specific and illustrative embodiments and techniques. However, it should be understood that many variations and modifications may be made while remaining within the spirit and scope of the invention.

What is claimed is:

1. A protein supplemented confectionery composition comprising a modified oilseed material, wherein the modified oilseed material comprises at least about 85 wt. % protein on a dry solids basis; and the modified oilseed material has an $MW_{50}$ of at least about 200 kDa and an NSI of at least about 80.

2. A protein supplemented confectionery composition comprising a modified oilseed material, wherein the modified oilseed material is produced by a process which includes:
    extracting oilseed material with an aqueous alkaline solution to form a suspension of particulate matter in an oilseed extract; and
    passing the extract through a filtration system including a microporous membrane to produce a permeate and a protein-enriched retentate, wherein the microporous membrane has a filtering surface with a contact angle of no more than 30 degrees.

3. The confectionery composition of claim 2 wherein the modified oilseed material is produced by a process which includes:
    extracting soybean material at 20° C. to 60° C. with an aqueous solution having a pH of 7.5 to 10.0 to form a mixture of particulate matter in an alkaline extract solution;
    removing at least a portion of the particulate matter from the mixture to form a clarified extract;
    passing the clarified extract at 55° C. to 60° C. through a filtration system including a microporous modified polyacrylonitrile membrane to produce a permeate and a protein-enriched retentate, wherein the microporous modified polyacrylonitrile membrane has an MWCO of 25,000 to 500,000 and a filtering surface with a contact angle of no more than 30 degrees; and
    diafiltering the protein-enriched retentate through the filtration system to produce a protein-containing diafiltration retentate.

4. The confectionery composition of claim 3 wherein the modified oilseed material is produced by a process which further includes heating the diafiltration retentate to at least 75° C. for a sufficient time to form a pasteurized retentate.

5. The confectionery composition of claim 2 wherein the modified oilseed material is produced by a process which includes extracting the soybean material at 20° C. to 60° C. for no more than one hour with the aqueous solution to form the mixture.

6. A protein supplemented confectionery composition comprising a modified soybean material;
    wherein the modified soybean material comprises at least 90 wt. % protein on a dry solids basis; and the modified soybean material has an $MW_{50}$ of at least 200 kDa and an EOR of no more than about 0.75 mL.

7. The confectionery composition of claim 6 further comprising a triacylglycerol component.

8. A protein supplemented confectionery composition comprising a modified oilseed material, wherein the modified oilseed material comprises at least about 85 wt. % protein on a dry solids basis; and the modified oilseed material has a bacterial load of no more than 50,000 cfu/g and a melting temperature of at least 87° C.

9. A confectionery composition comprising a modified oilseed material, wherein the modified oilseed material comprises at least 85 wt. % protein on a dry solids basis; at least about 40 wt. % of the modified soybean material has an apparent molecular weight of at least 300 kDa; and the modified oilseed material has a turbidity factor of no more than about 0.95 at 500 nm.

10. A confectionery composition comprising a modified oilseed material, wherein the modified oilseed material comprises at least 85 wt. % protein on a dry solids basis; at least about 40 wt. % of the modified oilseed material has an apparent molecular weight of at least 300 kDa; and the modified oilseed material has a viscosity slope of at least about 30 cP/min.

11. A confectionery composition comprising a modified soybean material, sugar and a triacylglycerol component;
wherein the modified soybean material comprises at least 90 wt. % protein on a dry solids basis; at least about 40 wt. % of the modified soybean material has an apparent molecular weight of at least 300 kDa; and the modified soybean material has a viscosity slope of at least about 30 cP/min and a melting temperature of at least 87° C.

12. A confectionery composition comprising a modified soybean material;
wherein the modified soybean material comprises at least 90 wt. % protein on a dry solids basis; at least about 40 wt. % of the modified soybean material has an apparent molecular weight of at least 300 kDa; and at least about 40 wt. % of the protein in a 50 mg sample of the modified oilseed material is soluble in 1.0 mL water at 25° C.

13. The confectionery composition of claim 12 wherein the modified oilseed material has a turbidity factor of no more than about 0.95 at 500 nm.

14. The confectionery composition of claim 12 wherein the modified oilseed material has an NSI of at least about 80.

15. The confectionery composition of claim 12 wherein the modified oilseed material is a modified soybean material which includes at least about 90 wt. % protein on a dry solids basis.

16. The confectionery composition of claim 12 wherein the modified oilseed material has a melting temperature of at least about 87° C.

17. The confectionery composition of claim 12 wherein the modified oilseed material has an $MW_{50}$ of at least about 400 kDa.

18. The confectionery composition of claim 12 wherein the modified oilseed material includes at least about 1.4 wt. % cysteine as a percentage of total protein.

19. The confectionery composition of claim 12 wherein the modified oilseed material is a soy protein isolate having a substantially bland taste.

20. The confectionery composition of claim 12 wherein the modified oilseed material has a dry Gardner L value of at least about 85.

21. The confectionery composition of claim 12 the modified oilseed material has a bacterial load of no more than about 50,000 cfu/g.

22. The confectionery composition of claim 12 wherein the modified oilseed material has a latent heat of at least about 5 joules/g.

23. The confectionery composition of claim 12 wherein the modified oilseed material has a ratio of sodium ions to a total amount of sodium, calcium and potassium ions of no more than about 0.5.

24. The confectionery composition of claim 12 wherein the modified oilseed material has no more than about 7000 mg/kg (dsb) sodium ions.

25. A protein supplemented confectionery composition comprising water, sugar and a modified soybean material; wherein the modified soybean material comprises at least about 90 wt. % protein on a dry solids basis; and the modified oilseed material has an $MW_{50}$ of at least about 400 kDa and at least about 40 wt. % of the protein in a 50 mg sample of the modified soybean material is soluble in 1.0 mL water at 25° C.

26. The confectionery composition of claim 25 further comprising a triacylglycerol component.

27. The confectionery composition of claim 26 wherein the triacylglycerol component includes vegetable oil, hydrogenated vegetable oil or a mixture thereof.

28. The confectionery composition of claim 25 comprising about 5 to 30 wt. % protein.

29. The confectionery composition of claim 25 comprising about 5 to 60 wt. % protein on a dry solids basis.

* * * * *